US012574181B2

(12) United States Patent
Sun et al.

(10) Patent No.: US 12,574,181 B2
(45) Date of Patent: Mar. 10, 2026

(54) SOUNDING REFERENCE SIGNAL (SRS) ENHANCEMENT FOR MULTI-TRANSMISSION AND RECEPTION POINT (TRP) OPERATION

(71) Applicant: Apple Inc., Cupertino, CA (US)

(72) Inventors: Haitong Sun, Cupertino, CA (US); Seyed Ali Akbar Fakoorian, San Diego, CA (US); Chunxuan Ye, San Diego, CA (US); Dawei Zhang, Saratoga, CA (US); Oghenekome Oteri, San Diego, CA (US); Jie Cui, San Jose, CA (US); Wei Zeng, Saratoga, CA (US); Hong He, San Jose, CA (US); Ankit Bhamri, Bad Nauheim (DE)

(73) Assignee: Apple Inc., Cupertino, CA (US)

( * ) Notice: Subject to any disclaimer, the term of this patent is extended or adjusted under 35 U.S.C. 154(b) by 381 days.

(21) Appl. No.: 18/199,460

(22) Filed: May 19, 2023

(65) Prior Publication Data

US 2024/0048323 A1     Feb. 8, 2024

Related U.S. Application Data

(60) Provisional application No. 63/395,592, filed on Aug. 5, 2022.

(51) Int. Cl.
*H04L 5/00* (2006.01)
*H04W 72/20* (2023.01)
*H04W 76/20* (2018.01)

(52) U.S. Cl.
CPC ........... *H04L 5/0051* (2013.01); *H04W 76/20* (2018.02)

(58) Field of Classification Search
CPC ... H04L 5/0051; H04L 5/0048; H04L 5/0094; H04W 76/20
(Continued)

(56) References Cited

U.S. PATENT DOCUMENTS

| 12,256,342 B2 | 3/2025 | Kang et al. |
| 2011/0249648 A1 | 10/2011 | Jen |

(Continued)

FOREIGN PATENT DOCUMENTS

| WO | WO 2021159399 A1 | 8/2021 |
| WO | WO 2022029330 A1 | 2/2022 |

(Continued)

OTHER PUBLICATIONS

Partial Search Result and Provisional Opinion Accompanying the Partial Search Result directed to related International Application No. PCT/US2023/071052, mailed Nov. 16, 2023; 20 pages.

(Continued)

*Primary Examiner* — Candal Elpenord
(74) *Attorney, Agent, or Firm* — Sterne, Kessler, Goldstein & Fox P.L.L.C.

(57) ABSTRACT

Some aspects of this disclosure relate to apparatuses and methods for implementing mechanisms for reducing interferences for Sounding Reference Signal (SRS) by, for example, one or more of frequency domain interference randomization, code domain interference randomization, or power control. For example, a user equipment (UE) can be configured to determine a comb offset and/or a cyclic shift for each Sounding Reference Signal (SRS) transmission occasion for the UE. The comb offset and/or the cyclic shift change between different SRS transmission occasions of the UE. The UE is further configured to transmit an SRS to the
(Continued)

500 base station using the determined comb offset and/or the determined cyclic shift during the SRS transmission occasion corresponding.

19 Claims, 12 Drawing Sheets

(58) Field of Classification Search
USPC .................................................. 370/329–330
See application file for complete search history.

(56) References Cited

U.S. PATENT DOCUMENTS

| | | | |
|---|---|---|---|
| 2020/0259683 A1 | 8/2020 | Manolakos et al. | |
| 2021/0075577 A1 | 3/2021 | Zhang et al. | |
| 2021/0314955 A1 | 10/2021 | Zhang et al. | |
| 2022/0039028 A1 | 2/2022 | Wernersson et al. | |
| 2022/0094500 A1 | 3/2022 | Liu et al. | |
| 2022/0116891 A1 | 4/2022 | Yao et al. | |
| 2022/0166583 A1 | 5/2022 | Si et al. | |
| 2022/0232535 A1 | 7/2022 | Abdelghaffar et al. | |
| 2022/0278881 A1 | 9/2022 | Munier et al. | |
| 2023/0030823 A1* | 2/2023 | Wang .................... | H04L 5/0048 |
| 2023/0276373 A1 | 8/2023 | Chen et al. | |
| 2024/0039670 A1* | 2/2024 | Huang .................. | H04L 5/0048 |
| 2024/0048419 A1 | 2/2024 | Sun et al. | |
| 2024/0049146 A1 | 2/2024 | Sun et al. | |
| 2024/0187176 A1 | 6/2024 | Wang et al. | |
| 2024/0259950 A1 | 8/2024 | Nilsson et al. | |
| 2024/0313913 A1* | 9/2024 | Gao ...................... | H04L 5/0051 |
| 2024/0372667 A1* | 11/2024 | Jacobsson ............. | H04L 5/0051 |
| 2025/0007561 A1 | 1/2025 | Gao | |
| 2025/0015952 A1* | 1/2025 | Shibaike ............... | H04W 72/04 |
| 2025/0039024 A1* | 1/2025 | Abdelghaffar ........ | H04L 5/0012 |
| 2025/0168042 A1* | 5/2025 | Han ...................... | H04W 88/085 |
| 2025/0184199 A1* | 6/2025 | Liu ...................... | H04L 27/2613 |
| 2025/0211474 A1 | 6/2025 | Chou et al. | |

FOREIGN PATENT DOCUMENTS

| | | |
|---|---|---|
| WO | WO 2022084954 A1 | 4/2022 |
| WO | WO 2022197600 A1 | 9/2022 |
| WO | WO 2023209666 A1 | 11/2023 |

OTHER PUBLICATIONS

Vivo: "Remaining issues on SRS enhancement", 3GPP Draft, R1-2110995, 3rd Generation Partnership Project (SGPP), Mobile Competence Centre 9 650, Route Des Lucioles; F-06921 Sophia-Antipolis Cedex 1 France, vol. RAN WG1, No. e-Meeting, Nov. 5, 2021, XP052073950, Retrieved from the Internet: URL:https://ftp.3gpp.org/tsg_ran/WG1 _RL1 /TSG R1_107-e/Docs/R1-21 10995.zip R1-21 10995_Remaining issues on SRS enhancement_final.docx [retrieved on Nov. 5, 2021].

Vivo: "Discussion on UL RS for NR positioning", SGPP Draft, R1-1908175, 3rd Generation Partnership Project (SGPP), Mobile Competence Centre 1 650, Route Des Lucioles; F-06921 Sophia-Antipolis Cedex 9 France, vol. RAN WG1, No. Prague, CZ, Aug. 17, 2019, XP051764794, Retrieved from the Internet: URL:http://www.3gpp.org/ftp/tsg_ran/WG1 _RL1 /TSG R1_98/Docs/R1-1908175.zip [retrieved on Aug. 17, 2019].

Bupt et al: "DL Reference Signals for NR Positioning", SGPP Draft, R1-1912137, Sad Generation Partnership Project (3GPP), Mobile Competence Centre 1 650, Route Des Lucioles; F-06921 Sophia-Antipolis Cedex I France, vol. RAN WG1, No. Reno, US, Nov. 9, 2019, XP051823218, Retrieved from the Internet: m, URL: https://ftp.3gpp.org/tsg_ran/WG1_RL1 /TSGRI_99/Docs/R1-1912137.zip DL Reference Signals for NR Positioning.docx [retrieved on Nov. 9, 2019].

International Search Report and Written Opinion directed to related International Application No. PCT/US2023/071052, mailed Jan. 9, 2024; 20 pages.

International Search Report and Written Opinion directed to related International Application No. PCT/US2023/071042, mailed Nov. 2, 2023; 9 pages.

U.S. Appl. No. 18/199,457, "Sounding Reference Signal (SRS) Enhancement For Multi-Transmission And Reception Point (TRP) Operation", to Haitong Sun, filed May 19, 2023.

U.S. Appl. No. 18/199,453, "Sounding Reference Signal (SRS) Enhancement For Multi-Transmission And Reception Point (TRP) Operation", to Haitong Sun, filed May 19, 2023.

International Search Report and Written Opinion directed to related International Application No. PCT/US2023/071053, mailed Nov. 9, 2023; 9 pages.

Samsung (Moderator), "New WID: MIMO Evolution for Downlink and Uplink," 3GPP TSG RAN Meeting #94e, Electronic Meeting, Dec. 6-17, 2021, RP-213598; 6 pages.

3GPP TS 38.211 V17.2.0 (Jun. 2022), 3rd Generation Partnership Project; Technical Specification Group Radio Access Network; NR; Physical channels and modulation (Release 17); 136 pages.

3GPP TS 38.213 V17.2.0 (Jun. 2022), 3rd Generation Partnership Project; Technical Specification Group Radio Access Network; NR; Physical layer procedures for control (Release 17); 256 pages.

3GPP TS 38.214 V17.2.0 (Jun. 2022), 3rd Generation Partnership Project; Technical Specification Group Radio Access Network; NR; Physical layer procedures for data (Release 17); 228 pages.

* cited by examiner

100

105b

UE

103b

103a

101b

101a

102a

102b

UE

107

105a

500

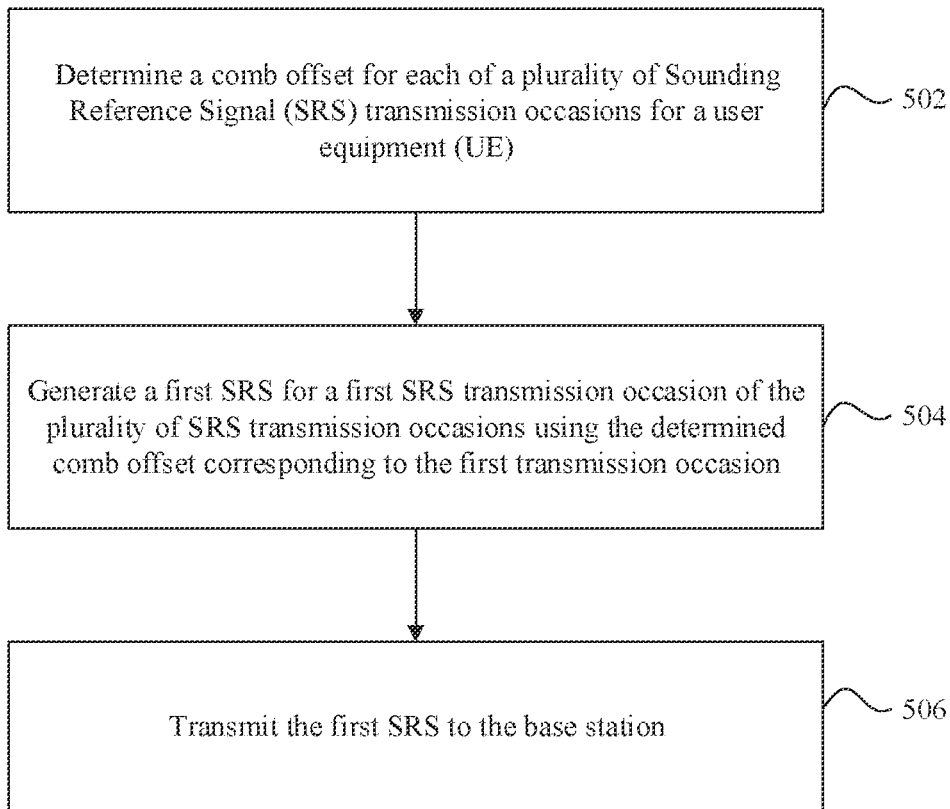

Determine a comb offset for each of a plurality of Sounding Reference Signal (SRS) transmission occasions for a user equipment (UE) ⟋ 502

Generate a first SRS for a first SRS transmission occasion of the plurality of SRS transmission occasions using the determined comb offset corresponding to the first transmission occasion ⟋ 504

Transmit the first SRS to the base station ⟋ 506

*FIG. 5*

Inter-Slot Cyclic Shift Hopping

720

SRS Transmission Occasion 723

SRS Transmission Occasion 725

Slot 701a

Slot 701b

Slot 701c

Slot 701d t

900

920

SOUNDING REFERENCE SIGNAL (SRS) ENHANCEMENT FOR MULTI-TRANSMISSION AND RECEPTION POINT (TRP) OPERATION

CROSS-REFERENCE TO RELATED APPLICATIONS

The present application claims the benefit of U.S. Provisional Patent Application No. 63/395,592, filed on Aug. 5, 2022, which is hereby incorporated by reference in its entirety.

BACKGROUND

Field

The described aspects generally relate to mechanisms for a network to reduce interferences for Sounding Reference Signal (SRS).

Related Art

A user equipment (UE) transmits a Sounding Reference Signal (SRS) to a base station to help the base station determine the channel quality of an uplink channel from the UE to the base station. The SRS is a reference signal transmitted using an SRS resource. The SRS resource can include the location of the SRS in time and frequency domain in a resource grid. In some implementations, the parameters for the SRS resource and/or SRS transmission can be determined by the base station, and can be communicated to the UE. If multiple UEs are communicating with one or multiple base stations (or one or multiple Transmission and Reception Points (TRPs)), the SRS transmissions from the UEs may interfere and the base station(s) may not be able to determine the channel quality based on the SRS transmissions.

SUMMARY

Some aspects of this disclosure relate to apparatuses and methods for implementing mechanisms for reducing interferences for Sounding Reference Signal (SRS) by, for example, one or more of frequency domain interference randomization, code domain interference randomization, or power control.

Some aspects of this disclosure relate to a user equipment (UE). The UE includes a transceiver configured to enable wireless communication with a base station and a processor communicatively coupled to the transceiver. The processor is configured to determine a comb offset for each of a plurality of Sounding Reference Signal (SRS) transmission occasions for the UE. The comb offset changes between each SRS transmission occasion of the plurality of SRS transmission occasions. The processor is further configured to generate a first SRS for a first SRS transmission occasion of the plurality of SRS transmission occasions using the determined comb offset corresponding to the first transmission occasion. The processor is further configured to transmit, using the transceiver, the first SRS to the base station.

In some aspects, the comb offset is determined based on a Radio Resource Control (RRC) configured comb size configuration, a RRC configured comb offset, and an offset applied to the RRC configured comb offset. For example, the comb offset for each SRS transmission occasion is determined as CombOffset(k)=mod(CombOffset+F(mod(k, COMB)),COMB), where k is a non-negative integer indicating the SRS transmission occasion, COMB is a Radio Resource Control (RRC) configured comb size configuration, mod is a modulo operation, CombOffset is a RRC configured comb offset, F is an offset applied to the RRC configured comb offset, and CombOffset(k) is the comb offset for the SRS transmission occasion k.

In some aspects, the offset applied to the RRC configured comb offset includes one or more of sequences including {0, 1} for the RRC configured comb size configuration of comb 2 configuration, {0, 3, 2, 1}, {0, 1, 2, 3}, or {0, 2, 1, 3} for the RRC configured comb size configuration of comb 4 configuration, and {0, 1, 2, 3, 4, 5, 6, 7}, {0, 3, 6, 1, 4, 7, 2, 5}, {0, 5, 2, 7, 4, 1, 6, 3}, {0, 7, 6, 5, 4, 3, 2, 1}, or {0, 4, 2, 6, 1, 5, 3, 7} for the RRC configured comb size configuration of comb 8 configuration.

In some aspects, the processor is configured to determine the comb offset for each SRS transmission occasion a number of times within a slot. In some aspects, the number of times is determined by a number of symbols used for SRS transmission divided by a repetition factor. In some aspects, the UE is configured to determine the number of symbols used for the SRS transmission and the repetition factor from a RRC message from the base station.

In some aspects, the processor is configured to determine the comb offset for each SRS transmission occasion once in a slot. In some aspects, the processor is configured to determine the comb offset for each SRS transmission occasion when the plurality of SRS transmission occasions share a same frequency location. In some aspects, the processor is configured to determine the comb offset for each SRS transmission occasion when the plurality of SRS transmission occasions have different frequency locations.

Some aspects of this disclosure relate to a method including determining, by a user equipment (UE), a comb offset for each of a plurality of Sounding Reference Signal (SRS) transmission occasions for the UE. The comb offset changes between each SRS transmission occasion of the plurality of SRS transmission occasions. The method further includes generating, by the UE, a first SRS for a first SRS transmission occasion of the plurality of SRS transmission occasions using the determined comb offset corresponding to the first transmission occasion. The method further includes transmitting, by the UE, the first SRS to a base station.

Some aspects of this disclosure relate to a non-transitory computer-readable medium storing instructions. When the instructions are executed by a processor of a user equipment (UE), the instructions cause the processor to perform operations including determining a comb offset for each of a plurality of Sounding Reference Signal (SRS) transmission occasions for the UE. The comb offset changes between each SRS transmission occasion of the plurality of SRS transmission occasions. The operations further include generating a first SRS for a first SRS transmission occasion of the plurality of SRS transmission occasions using the determined comb offset corresponding to the first transmission occasion. The operations further include transmitting the first SRS to a base station. The comb offset can be determined based on a Radio Resource Control (RRC) configured comb size configuration, a RRC configured comb offset, and offset applied to the RRC configured comb offset.

Some aspects of this disclosure relate to a user equipment (UE). The UE includes a transceiver configured to enable wireless communication with a base station and a processor communicatively coupled to the transceiver. The processor is configured to determine a cyclic shift for each of a plurality of Sounding Reference Signal (SRS) transmission occasions for the UE. The cyclic shift changes between each SRS transmission occasion of the plurality of SRS transmission occasions. The processor is further configured to generate a first SRS for a first SRS transmission occasion of the plurality of SRS transmission occasions using the determined cyclic shift corresponding to the first transmission occasion. The processor is further configured to transmit, using the transceiver, the first SRS to the base station.

In some aspects, the cyclic shift is determined based on a Radio Resource Control (RRC) configured comb size configuration, a RRC configured cyclic shift, and an offset applied to the RRC configured cyclic shift. For example, the cyclic shift for each SRS transmission occasion is determined as $$CyclicShift(k) = \text{mod}(CyclicShift + F(\text{mod}(k, n_{SRS}^{CS,max})), n_{SRS}^{CS,max}),$$

where k is a non-negative integer indicating the SRS transmission occasion, $$n_{SRS}^{CS,max}$$

is the maximum number of cyclic shifts derived from a Radio Resource Control (RRC) configured comb size configuration, mod is a modulo operation, CyclicShift is a RRC configured cyclic shift, F is an offset applied to the RRC configured cyclic shift, and CyclicShift(k) is the cyclic shift for the SRS transmission occasion k.

In some aspects, the offset applied to the RRC configured cyclic shift includes one or more of sequences including {0, 1, 2, 3, 4, 5}, {0, 2, 4, 1, 3, 5}, {0, 3, 1, 4, 2, 5}, or {0, 5, 4, 3, 2, 1} for the maximum number of cyclic shifts of 6, {0, 1, 2, 3, 4, 5, 6, 7}, {0, 4, 2, 6, 1, 5, 3, 7}, {0, 3, 6, 1, 4, 7, 2, 5}, {0, 5, 2, 7, 4, 1, 6, 3}, {0, 7, 6, 5, 4, 3, 2, 1}, or {0, 4, 2, 6, 1, 5, 3, 7} for the maximum number of cyclic shifts of 8, and {0, 1, 2, 3, 4, 5, 6, 7, 8, 9, 10, 11}, {0, 6, 3, 9, 2, 8, 4, 10, 1, 7, 5, 11}, {0, 3, 6, 9, 1, 4, 7, 10, 2, 5, 8, 11}, {0, 5, 10, 3, 8, 1, 6, 11, 4, 9, 2, 7}, {0, 7, 2, 9, 4, 11, 6, 1, 8, 3, 10, 5}, or {0, 11, 10, 9, 8, 7, 6, 5, 4, 3, 2, 1} for the maximum number of cyclic shifts of 12.

In some aspects, the processor is configured to determine the cyclic shift for each SRS transmission occasion a number of times within a slot. In some aspects, the number of times is determined by a number of symbols used for SRS transmission divided by a repetition factor. In some aspects, the UE is configured to determine the number of symbols used for the SRS transmission and the repetition factor from a RRC message from the base station.

In some aspects, the processor is configured to determine the cyclic shift for each SRS transmission occasion once in a slot. In some aspects, the processor is configured to determine the cyclic shift for each SRS transmission occasion when the plurality of SRS transmission occasions share a same frequency location. In some aspects, the processor is configured to determine the cyclic shift for each SRS transmission occasion when the plurality of SRS transmission occasions have different frequency locations.

In some aspects, the processor is further configured to determine an SRS base sequence from a message from the base station and use the determined SRS base sequence to generate the SRS.

Some aspects of this disclosure relate to a method including determining, by a user equipment (UE), a cyclic shift for each of a plurality of Sounding Reference Signal (SRS) transmission occasions for the UE. The cyclic shift changes between each SRS transmission occasion of the plurality of SRS transmission occasions. The method further includes generating, by the UE, a first SRS for a first SRS transmission occasion of the plurality of SRS transmission occasions using the determined cyclic shift corresponding to the first transmission occasion. The method further includes transmitting, by the UE, the first SRS to a base station.

Some aspects of this disclosure relate to a non-transitory computer-readable medium storing instructions. When the instructions are executed by a processor of a user equipment (UE), the instructions cause the processor to perform operations including determining a cyclic shift for each of a plurality of Sounding Reference Signal (SRS) transmission occasion for the UE. The cyclic shift changes between each SRS transmission occasion of the plurality of SRS transmission occasions. The operations further include generating a first SRS for a first SRS transmission occasion of the plurality of SRS transmission occasions using the determined cyclic shift corresponding to the first transmission occasion. The operations further include transmitting the first SRS to a base station. The cyclic shift can be determined based on a Radio Resource Control (RRC) configured comb size configuration, a RRC configured cyclic shift, and offset applied to the RRC configured cyclic shift.

Some aspects of this disclosure relate to a base station. The base station includes a transceiver configured to enable wireless communication with a user equipment (UE) and a processor communicatively coupled to the transceiver. The processor is configured to control a first Transmission Reception Point (TRP) and a second TRP that are associated with the base station. The processor is further configured to configure one or more Sounding Reference Signal (SRS) power control parameters. The processor is further configured to transmit, using the transceiver, the configured one or more SRS power control parameters to the UE for use in transmission by the UE of an SRS to the first TRP and/or the second TRP. The one or more SRS power control parameters are configured per an SRS resource in an SRS resource set including one or more SRS resources. Additionally, or alternatively, the one or more SRS power control parameters comprise additional parameters for the second TRP in the SRS resource set compared to parameters for the first TRP.

In some aspects, the one or more SRS power control parameters comprises one or more of an Open Loop Power Control (OPLC) pathloss compensation factor (alpha), an OLPC desired received power at the transceiver of the base station (p0), or OLPC pathloss estimate reference signals (pathlossReferenceRS).

In some aspects, the one or more SRS power control parameters comprise a first set of parameters for the first TRP and a second set parameters for the second TRP. In some aspects, the first set of parameters for the first TRP enables the UE to determine a first SRS transmission power for the first TRP and the second set of parameters for the second TRP enables the UE to determine a second SRS transmission power for the second TRP.

In some aspects, an actual SRS transmission power can be determined by the UE as a highest SRS transmission power between the first SRS transmission power and the second SRS transmission power. In some aspects, an actual SRS transmission power can be determined by the UE as an average SRS transmission power between the first SRS transmission power and the second SRS transmission power.

In some aspects, the additional parameters for the second TRP comprise one or more of an Open Loop Power Control (OPLC) pathloss compensation factor (alpha), an OLPC desired received power at the transceiver of the base station (p0), or OLPC pathloss estimate reference signals (pathloss-ReferenceRS).

Some aspects of this disclosure relate to a method including controlling, by a base station, a first Transmission Reception Point (TRP) and a second TRP that are associated with the base station. The method further includes configuring, by the base station, one or more Sounding Reference Signal (SRS) power control parameters and transmitting, by the base station, the configured one or more SRS power control parameters to a user equipment (UE) for use in transmission of an SRS to the first TRP and/or the second TRP. The one or more SRS power control parameters are configured per an SRS resource in an SRS resource set including one or more SRS resources. Additionally, or alternatively, the one or more SRS power control parameters comprise additional parameters for the second TRP in the SRS resource set compared to parameters for the first TRP.

Some aspects of this disclosure relate to a non-transitory computer-readable medium storing instructions. When the instructions are executed by a processor of a base station, the instructions cause the processor to perform operations including controlling, by a base station, a first Transmission Reception Point (TRP) and a second TRP that are associated with the base station. The operations further include configuring, by the base station, one or more Sounding Reference Signal (SRS) power control parameters and transmitting, by the base station, the configured one or more SRS power control parameters to a user equipment (UE) for use it transmission of an SRS to the first TRP and/or the second TRP. The one or more SRS power control parameters are configured per an SRS resource in an SRS resource set including one or more SRS resources. Additionally, or alternatively, the one or more SRS power control parameters include additional parameters for the second TRP in the SRS resource set compared to parameters for the first TRP.

Some aspects of this disclosure relate to a user equipment (UE) including a transceiver configured to enable wireless communication with a base station that controls a first Transmission Reception Point (TRP) and a second TRP that are associated with the base station and a processor communicatively coupled to the transceiver. The processor is configured to receive one or more Sounding Reference Signal (SRS) power control parameters configured by the base station and determine, based on the received one or more SRS power control parameters, an actual SRS transmission power for transmitting an SRS to the first TRP and/or the second TRP. The one or more SRS power control parameters are configured per an SRS resource in an SRS resource set including one or more SRS resources. Additionally, or alternatively, the one or more SRS power control parameters include additional parameters for the second TRP in the SRS resource set compared to parameters for the first TRP.

Some aspects of this disclosure relate to a method including receiving, by a user equipment (UE), one or more Sounding Reference Signal (SRS) power control parameters configured by a base station. The base station controls a first Transmission Reception Point (TRP) and a second TRP that are associated with the base station. The method further includes determining, based on the received one or more SRS power control parameters, an actual SRS transmission power for transmitting an SRS to the first TRP and/or the second TRP. The one or more SRS power control parameters are configured per an SRS resource in an SRS resource set including one or more SRS resources. Additionally, or alternatively, the one or more SRS power control parameters include additional parameters for the second TRP in the SRS resource set compared to parameters for the first TRP.

Some aspects of this disclosure relate to a non-transitory computer-readable medium storing instructions. When the instructions are executed by a processor of user equipment (UE), the instructions cause the processor to perform operations including receiving one or more Sounding Reference Signal (SRS) power control parameters configured by a base station. The base station that controls a first Transmission Reception Point (TRP) and a second TRP that are associated with the base station. The method further includes determining, based on the received one or more SRS power control parameters, an actual SRS transmission power for transmitting an SRS. The one or more SRS power control parameters are configured per an SRS resource in an SRS resource set including one or more SRS resources. Additionally, or alternatively, the one or more SRS power control parameters include additional parameters for the second TRP in the SRS resource set compared to parameters for the first TRP.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIG. 5 illustrates an example method for a system (for example, a UE) supporting mechanisms for comb offset hopping for SRS interference randomization, according to some aspects of the disclosure.

Figure 1:
FIG. 1 illustrates an example system implementing mechanisms for a network to implement mechanisms for reducing interferences for Sounding Reference Signal (SRS), according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure relate to apparatuses and methods for implementing mechanisms for reducing interferences for Sounding Reference Signal (SRS) by, for example, one or more of frequency domain interference randomization, code domain interference randomization, or power control.

In some examples, the aspects of this disclosure can be performed by a network and/or a UE that operates according to new radio (NR) of $5^{th}$ generation (5G) wireless technology for digital cellular networks as defined by 3rd Generation Partnership Project (3GPP). Additionally, or alternatively, the aspects of this disclosure can be performed by a network and/or a UE that operates according to the Release 18 (Rel-18), Release 17 (Rel-17), Release 16 (Rel-16), and Release 15 (Rel-15), or others. However, the aspects of this disclosure are not limited to these examples, and one or more mechanisms of this disclosure can be implemented by other network(s) and/or UE(s) for using one or more of frequency domain interference randomization, code domain interference randomization, or power control for reducing interferences for SRS.

FIG. 1 illustrates an example system 100 implementing mechanisms for reducing interferences for Sounding Reference Signal (SRS), according to some aspects of the disclosure. Example system 100 is provided for the purpose of illustration only and does not limit the disclosed aspects.

System 100 may include, but is not limited to, one or more Transmission and Reception Points (TRPs) 101a and 101b, electronic devices (for example, a UE) 105a and 105b, and a base station 107 (for example, a base stations such as eNBs, gNBs, and the like). The electronic devices 105a and 105b (hereinafter referred to as UE 105) can include an electronic device configured to operate based on a wide variety of wireless communication techniques. These techniques can include, but are not limited to, techniques based on 3rd Generation Partnership Project (3GPP) standards. For example, the UE 105 can include an electronic device configured to operate using NR, Rel-18, Rel-17, and/or other releases of 3GPP standards. The UE 105 can include, but is not limited to, as wireless communication devices, smart phones, laptops, desktops, tablets, personal assistants, monitors, televisions, wearable devices, Internet of Things (IoTs), vehicle's communication devices, and the like.

The TRPs 101a and 101b (hereinafter referred to as TRP 101) and the base station 107 (herein referred to as base station or cell) can include nodes configured to operate based on a wide variety of wireless communication techniques such as, but not limited to, techniques based on 3GPP standards. For example, the base station 101 can include nodes configured to operate using NR, Rel-18, Rel-17, and/or other releases of 3GPP standards. According to some aspects, the TRPs 101a and/or 101b can be coupled with and/or controlled by the base station 107. Additionally, or alternatively, the TRPs 101a and/or 101b can be part of the base station 107. For example, the TRP 101 can include antenna arrays (e.g., with one or more antenna elements) available to the base station 107 and located at a specific geographical location In some implementations, each TRP 101 can be part of (and/or be coupled with and controlled by) its corresponding base station. However, the aspects of this disclosure are not limited to these examples and the TRP 101 and the base station 107 can have other connections and/or relations.

According to some aspects, the UE 105 can be connected to and can be communicating with the base station 107 using the TRP 101. For example, the UE 105a can communicate with base station 107 and/or the TRP 101a using a carrier 102a. The UE 105a can communicate with base station 107 and/or the TRP 101b using a carrier 102b. Similarly, the UE 105b can communicate with base station 107 and/or the TRP 101a using a carrier 103a. And, the UE 105b can communicate with base station 107 and/or the TRP 101b using a carrier 103b. According to some aspects, the carrier 102 (the carrier 102 herein refers to carriers 102a and 102b collectively) and/or the carrier 103 (the carrier 103 herein refers to carriers 103a and 103b collectively) can include one carrier. Additionally, or alternatively, the carrier 102 and/or 103 can include two or more component carriers (CC). In other words, the UE 105 can implement carrier aggregation (CA). For example, the UE can use multiple carriers for communication with the base station 101.

According to some aspects, the UE 105 can be configured to transmit SRS to the TRP 101 and/or the base station 107. The SRS can help, for example, the base station 107 to determine the channel quality of an uplink channel from the UE 105 to the base station 107. For example, the SRS can be used for uplink channel sounding, which can include, but is not limited to, channel estimation and synchronization. The SRS can be an uplink orthogonal frequency division multiplexing (OFDM) signal filled with a Zadoff-Chu sequence on different subcarriers. According to some implementations, the SRS is known by both the UE 105 and the base station 107.

The UE 105 can transmit the SRS during one or more SRS transmission occasions (e.g., SRS resources). The SRS transmission occasion (e.g., the SRS resource) can include the location of the SRS in a time and frequency domain in a resource grid. In some implementations, the SRS transmission occasion can include one or more resource elements. In some implementations, the parameters for the SRS transmission occasion and/or the SRS transmission can be determined by the base station 107, and can be communicated to the UE 105.

In some examples (e.g., in Rel-15), the SRS can only be transmitted in the last 6 symbols of each slot, the SRS can be repeated up to 4 symbols, and the SRS can only support comb 1/2/4 configurations. In some implementations, comb 1 configuration includes a configuration where no SRSs are multiplexed. Comb 2 configuration can include a configuration where 2 SRSs are multiplexed. And, comb 4 configuration includes a configuration where 4 SRSs are multiplexed.

In some examples (e.g., in Rel-16), the SRS can be transmitted in any symbol in a slot, the SRS can support repetition with 8 and 12 symbols, and the SRS can support comb 8 configuration (in addition to comb 1/2/4 configurations).

In some examples (e.g., in Rel-17), flexible aperiodic (AP) SRS triggering can be supported. Also, Resource Block (RB) level Partial Frequency Sounding (RPFS) can be supported. Additionally, SRS repetition with 10 and 14 symbols and comb 8 configuration with 4 ports can be supported. In some implementations in Rel-17, Channel State Information (CSI) feedback is further enhanced for NCJT (Non-coherent Joint Transmission) for Multi-TRP. The enhancement can be based on Type I MIMO codebook and it can only support the Single-DCI Multi-TRP NCJT scheme 1a (e.g., SDM (spatial domain multiplexing)), according to some implementations.

As discussed in more detail below, system 100 of FIG. 1 is configured to implement mechanisms for reducing interferences for SRS by, for example, one or more of frequency domain interference randomization, code domain interference randomization, or power control. In some implementations, the SRS mechanisms of system 100 can be applied to Multi-TRP CJT operation.

In some implementations, the UE 105, the base station 107, and/or the TRP 101 are configured to determine (e.g., configure) one or more parameters for the SRS transmission occasions (e.g., the SRS resources) to implement one or more of frequency domain interference randomization, code domain interference randomization, or power control. In some implementations, the SRS mechanisms of system 100 can be applied to Multi-TRP CJT operation. Although some aspects of this disclosure are discussed with respect to the base station 107, similar operations can be performed by the base station 107 and/or the TRP 101.

In some implementations, the UE 105 and/or the base station 107 are configured to determine (e.g., configure) one or more parameters for the SRS transmission occasions (e.g., the SRS resources) to implement the frequency domain interference randomization. For example, the UE 105 and/or the base station 107 can be configured to determine (e.g., configure) a comb offset for each SRS transmission occasion for comb offset hopping for SRS interference randomization. Additionally, or alternatively, the comb offset hopping can be considered for intra-slot comb offset hopping or inter-slot comb offset hopping. Also, the base station 107 is configured to determine the SRS transmission occasion for the comb offset hopping.

In some implementations, the UE 105 and/or the base station 107 are configured to determine (e.g., configure) one or more parameters for the SRS transmission occasions (e.g., the SRS resources) to implement the code domain interference randomization. For example, the UE 105 and/or the base station 107 can be configured to determine (e.g., configure) at least one of an SRS base sequence or a cyclic shift (CS) for each SRS transmission occasion. In some implementations, the UE 105 and/or the base station 107 can be configured to determine (e.g., configure) the CS for CS hopping for SRS interference randomization. Additionally, or alternatively, the CS hopping can be considered for intra-slot comb offset hopping or inter-slot comb offset hopping. Also, the base station 107 is configured to determine the SRS transmission occasion for the CS hopping.

In some implementations, the UE 105 and/or the base station 107 are configured to determine (e.g., configure) one or more parameters for the SRS transmission occasions (e.g., the SRS resources) to implement the power control enhancement. For example, the UE 105 and/or the base station 107 can be configured to determine (e.g., configure) one or more SRS power control parameters for each SRS transmission occasion. In some implementations, the SRS power control parameters are configured per an SRS-Resource in an SRS-ResourceSet, where SRS-ResourceSet includes one or more SRS-Resources. Additionally, or alternatively, the SRS power control parameters can include additional parameters for a second TRP (e.g., the TRP 103b) in the SRS-ResourceSet. The additional parameters for the second TRP are in addition to parameters for the first TRP. Additionally, or alternatively, the SRS power control parameters can include a first set of parameters for a TRP (e.g., the TRP 103a) and a second set parameters for a second TRP (e.g., the TRP 103b).

The base station 107 can communicate the one or more parameters for the SRS transmission occasions for the frequency domain interference randomization, the code domain interference randomization, or the power control to the UE 105. In a non-limiting example, the base station 107 can use Radio Resource Control (RRC) messages to communicate the one or more parameters for the SRS transmission occasions. For example, the base station 107 can use SRS-Resource message (also referred to as SRS-Resource parameters) to communicate the one or more parameters for the SRS transmission occasions. The UE 105 can use the one or more parameters for the SRS transmission occasions that the UE receives from the base station 107 and/or that the UE determines for transmitting SRS to the base station 107.

According to some aspects, system 100 can perform the frequency domain interference randomization, the code domain interference randomization, or the power control separately. Additionally, or alternatively, system 100 can perform any combination of the frequency domain interference randomization, the code domain interference randomization, and the power control. In some examples, system can be configured to perform the frequency domain interference randomization with the code domain interference randomization. In some examples, system can be configured to perform the frequency domain interference randomization with the power control. In some examples, system can be configured to perform the code domain interference randomization with the power control. In some examples, system can be configured to perform the frequency domain interference randomization with the code domain interference randomization and with the power control. In some examples, system 100 can perform one or more the frequency domain interference randomization, the code domain interference randomization, or the power control with other mechanisms.

Figure 2:
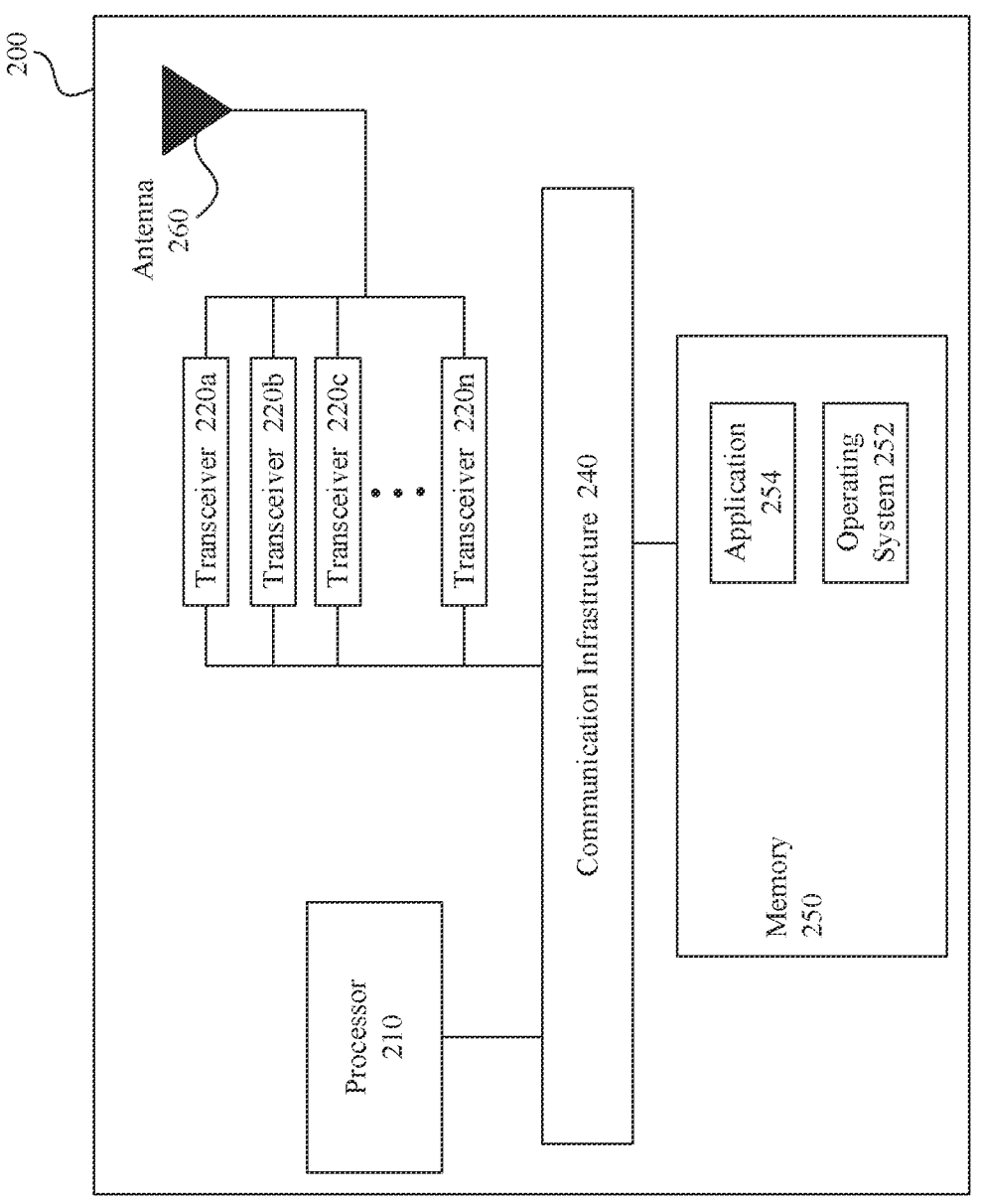
FIG. 2 illustrates a block diagram of an example system of an electronic device implementing mechanisms for reducing interferences for SRS, according to some aspects of the disclosure.

FIG. 2 illustrates a block diagram of an example system 200 of an electronic device implementing mechanisms for reducing interferences for SRS, according to some aspects of the disclosure. System 200 may be any of the electronic devices (e.g., the TRP 101, the UE 105, and/or the base station 107) of system 100. The system 200 (e.g., a wireless system) includes at least a processor 210, one or more transceivers 220a-220n, a communication infrastructure 240, a memory 250, an operating system 252, an application 254, and an antenna 260. Illustrated systems are provided as exemplary parts of the system 200, and the system 200 can include other circuit(s) and subsystem(s). Also, although the systems of the system 200 are illustrated as separate components, the aspects of this disclosure can include any combination of these, fewer, more, and/or different components.

The memory 250 may include random access memory (RAM) and/or cache, and may include control logic (e.g., computer software) and/or data. The memory 250 may include other storage devices or memory such as, but not limited to, a hard disk drive and/or a removable storage device/unit. According to some examples, the operating system 252 can be stored in the memory 250. The operating system 252 can manage transfer of data from the memory 250 and/or one or more applications 254 to the processor 210 and/or one or more transceivers 220a-220n. In some examples, the operating system 252 maintains one or more network protocol stacks (e.g., Internet protocol stack, cellular protocol stack, and the like) that can include a number of logical layers. At corresponding layers of the protocol stack, the operating system 252 includes control mechanism and data structures to perform the functions associated with that layer.

According to some examples, the application 254 can be stored in the memory 250. The application 254 can include applications (e.g., user applications) used by the system 200 and/or a user of the system 200. The applications in application 254 can include applications such as, but not limited to, audio streaming, video streaming, remote control, and/or other user applications.

The system 200 can also include the communication infrastructure 240. The communication infrastructure 240 provides communication between, for example, the processor 210, one or more transceivers 220a-220n, and the memory 250. In some implementations, the communication infrastructure 240 may be a bus. The processor 210 together with instructions stored in the memory 250 performs operations enabling the system 200 of system 100 to implement mechanisms for reducing interferences for SRS, as described herein. Additionally, or alternatively, the one or more transceivers 220a-220n perform operations enabling the system 200 of system 100 to implement mechanisms for reducing interferences for SRS.

The one or more transceivers 220a-220n transmit and receive communications signals that support mechanisms for reducing interferences for SRS, according to some aspects, and may be coupled to the antenna 260. The antenna 260 may include one or more antennas that may be the same or different types. The one or more transceivers 220a-220n allow the system 200 to communicate with other devices that may be wired and/or wireless. In some examples, the one or more transceivers 220a-220n can include processors, controllers, radios, sockets, plugs, buffers, and like circuits/devices used for connecting to and communication on networks. According to some examples, the one or more transceivers 220a-220n include one or more circuits to connect to and communicate on wired and/or wireless networks.

According to some aspects, the one or more transceivers 220a-220n can include a cellular subsystem, a WLAN subsystem, and/or a Bluetooth™ subsystem, each including its own radio transceiver and protocol(s) as will be understood by those skilled arts based on the discussion provided herein. In some implementations, the one or more transceivers 220a-220n can include more or fewer systems for communicating with other devices.

In some examples, the one or more transceivers 220a-220n can include one or more circuits (including a WLAN transceiver) to enable connection(s) and communication over WLAN networks such as, but not limited to, networks based on standards described in IEEE 802.11. Additionally, or alternatively, the one or more transceivers 220a-220n can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, the transceiver 220n can include a Bluetooth™ transceiver.

Additionally, the one or more transceivers 220a-220n can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, the one or more transceivers 220a-220n can be configured to operate according to one or more of Rel-15, Rel-16, Rel-17, Rel-18, NR, or other of the 3GPP standards.

According to some aspects, the processor 210, alone or in combination with computer instructions stored within the memory 250, and/or the one or more transceiver 220a-220n, implements mechanisms for reducing interferences for SRS, as discussed herein.

As discussed above, in some implementations, the mechanisms for reducing interferences for SRS can include frequency domain interference randomization. For example, a base station (e.g., the base station 107) and/or a UE (e.g., the UE 105) are configured to determine (e.g., configure) one or more parameters for the SRS transmission occasions (e.g., the SRS resources) to implement the frequency domain interference randomization. For example, the UE 105 and/or the base station 107 can be configured to determine (e.g., configure) a comb offset for each SRS transmission occasion for comb offset hopping for SRS interference randomization. Additionally, or alternatively, the comb offset hopping can be considered for intra-slot comb offset hopping or inter-slot comb offset hopping. Also, the base station 107 is configured to determine the SRS transmission occasion for the comb offset hopping.

In current implementations, when the base station configures parameters for the SRS transmission occasions for each UE, the base station does not change these configuration parameters. Therefore, if there is a conflict between two UEs' SRS transmissions, this conflict (e.g., collision between UEs' SRSs) will be persistent and will not resolve. As discussed in more detail below, some aspects of this disclosure relate to apparatuses and methods for changing the parameters for the SRS transmission occasions for each UE such that any possible interference between the UEs' SRS transmissions can be reduced and will not be persistent. Changing the parameters for the SRS transmission occasions for each UE can include one or more of the frequency domain interference randomization, the code domain interference randomization, or power control.

Figure 3:
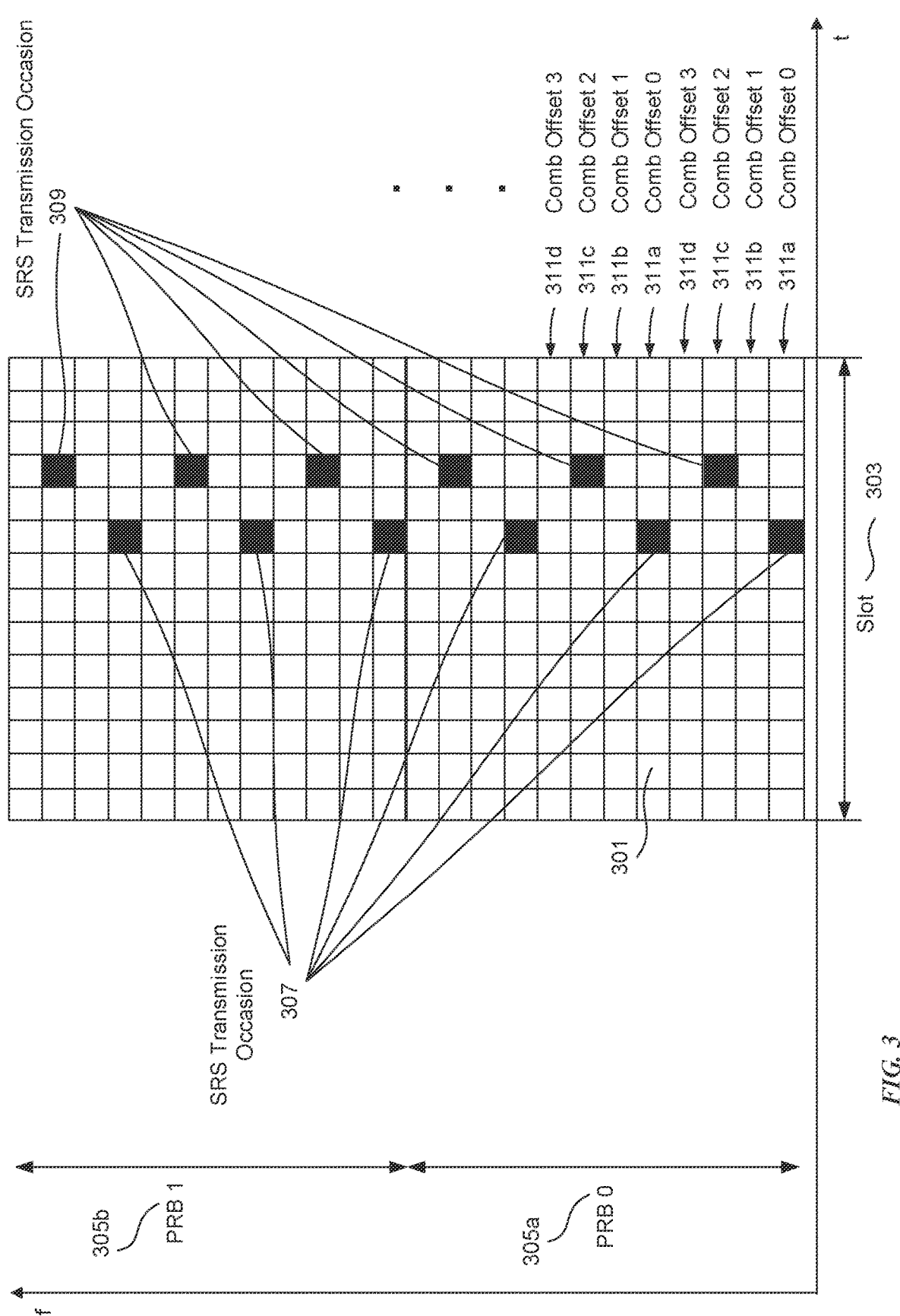
FIG. 3 illustrates an exemplary comb offset hopping for SRS interference randomization, according to some aspects of the disclosure.

FIG. 3 illustrates an exemplary comb offset hopping for SRS interference randomization, according to some aspects of this disclosure. The comb offset hopping for SRS interference randomization can be used for the frequency domain interference randomization.

FIG. 3 illustrates a plurality of resource elements 301. A resource element 301 can be the smallest physical resource and can include one subcarrier during one orthogonal frequency division multiplexing (OFDM) symbol. The resource element 301 can be identified by a first index in the frequency domain and a second index referring to the OFDM symbol position in the time domain relative to some reference point. According to some aspects, a Resource Block (RB) can include 12 consecutive subcarriers in the frequency domain.

In some implementations, the resource elements 301 are within one slot 303. The slot 303 can include a number of symbols in the time domain. In some non-limiting examples, the slot 303 can include 14 symbols in the time domain. In some implementations, the slot 303 can include a number of subcarriers in the frequency domain. In some non-limiting examples, the slot 303 can include 12 subcarriers in Physical Resource Block PRB0 305*a* and 12 subcarriers in PRB1 305*b*. However, the aspects of this disclosure are not limited to these examples and other number of symbols and sub-carriers can be used.

According to some aspects, a UE (e.g., the UE 105) can be configured to transmit the SRS at one or more SRS transmission occasions (e.g., SRS resources) 307 and 309. In some implementations, the SRS transmission occasions 307 and 309 are configured by the base station and the configuration parameters are transmitted to the UE for transmitting the SRS. Additionally, or alternatively, the UE is configured to determine one or more parameters of the SRS transmission occasions 307 and 309 as discussed herein.

In some implementations, the configuration parameters for the SRS transmission occasions can include a comb size configuration (also referred to herein as comb size). The comb size configuration can determine how many SRSs can be multiplexed. For example, a comb 1 configuration includes a configuration where no SRSs are multiplexed. A comb 2 configuration can include a configuration where 2 SRSs are multiplexed. A comb 4 configuration includes a configuration where 4 SRSs are multiplexed. A comb 8 configuration includes a configuration where 8 SRSs are multiplexed. These SRSs that are multiplexed are transmitted by different UEs. For example, for the comb 4 configuration, four different UEs can transmit their SRSs at the same SRS transmission occasions that are located in different subcarriers (therefore, 4 SRSs are multiplexed).

In some implementations, the configuration parameters for the SRS transmission occasions can include a number of symbols that can be used for the SRS transmission.

In some implementations, the configuration parameters for the SRS transmission occasions can include a comb offset. According to some aspects, the comb offset can define a resource element for the SRS transmission occasion compared to the resource element with the subcarrier with the lowest frequency. In some examples, as illustrated in FIG. 3 for comb 4 configuration, four comb offsets can be used—comb offset 0, comb offset 1, comb offset 2, and comb offset 3. The comb offsets can be used for multiplexing SRSs.

In current implementations, when the base station configures a comb offset for a UE, the base station does not change the comb offset for that UE for different SRS transmission occasions. For example, if the base station configures comb offset 0 for a first UE and configures the comb offset 0 for a second UE, the first and second UEs will have their SRSs collided and the base station does not change the comb offset for the first and second UEs. However, the aspects of this disclosure are directed to changing the comb offset for each UE for the SRS transmission occasions to reduce the possibility of interferences.

In some implementations, each SRS transmission occasion can include one or more resource elements. The one or more resource elements in the SRS transmission occasion can be associated with the same symbol(s) and distributed over subcarriers based on comb offset. As illustrated in FIG. 3, the comb offset 0 311*a* defines one or more resource elements for the SRS transmission occasion with zero offset compared to the resource elements with the subcarrier with the lowest frequency. The comb offset 1 311*b* defines one or more resource elements for the SRS transmission occasion with an offset of one compared to the resource elements with the subcarrier with the lowest frequency. The comb offset 2 311*c* defines one or more resource elements for the SRS transmission occasion with an offset of two compared to the resource elements with the subcarrier with the lowest frequency. The comb offset 3 311*d* defines one or more resource elements for the SRS transmission occasion with an offset of three compared to the resource elements with the subcarrier with the lowest frequency. The comb offsets 0-3 repeats towards the subcarrier with the highest frequency. According to some implementations, the number of usable comb offsets depends on the comb size configuration.

According to some aspects, system 100 is configured to implement comb offset hopping for SRS interference randomization for each UE. The comb offset hopping for SRS interference randomization can be used for the frequency domain interference randomization. FIG. 3 illustrates one exemplary comb offset hopping for SRS interference randomization for each UE. The exemplary comb offset hopping of FIG. 3 is an intra-slot comb offset hopping. As discussed in more detail below, FIG. 4B illustrates and exemplary inter-slot comb offset hopping.

According to some aspects, the UE and/or the base station are configured to determine (e.g., configure) comb offset for each SRS transmission occasion to implement comb offset hopping for the UE. The base station can communicate the configured comb offsets to the UE so that the UE can use the configured comb offsets for transmitting the SRS. In some examples, the base station can use RRC messages to communicate the configured comb offsets to the UE. The base station can use other messages to communicate the configured comb offsets to the UE. In some implementations, the base station can communicate the configured comb offsets to the UE when the UE is connecting to the base station. Additionally, or alternatively, the base station can communicate the configured comb offsets to the UE one or more times during the time the UE is connected to the base station.

Alternatively, the UE is configured to determine (e.g., configure) comb offset for each SRS transmission occasion to implement comb offset hopping for the UE. The UE can use one or more parameters that the UE receives from the base station with the methods discussed herein to determine (e.g., configure) comb offset for each SRS transmission occasion to implement comb offset hopping.

In the exemplary comb offset hopping of FIG. 3, the first SRS transmission occasion 307 can have the comb offset 0 (311*a*) for transmitting a first SRS. In other words, the base station has configured the comb offset for the UE for the first SRS transmission occasion 307 to comb offset 0 (311*a*.) For the second SRS transmission occasion 309 for transmitting a second SRS, the base station has configured the comb offset for the UE to comb offset 2 (311*c*). Therefore, by changing the comb offset for each UE for different SRS transmission occasions 307 and 309, the probability of interference between different UEs' SRS transmission decreases.

According to some aspects, the comb offset for each SRS transmission occasion can be determined as:

$$\text{CombOffset}(k)=\text{mod}(\text{CombOffset}+F(\text{mod}(k,\text{COMB})),\text{COMB}) \quad \text{Equation (1).}$$

Here, k is a non-negative integer indicating the SRS transmission occasion. For example, k=0, 1, 2, 3, . . . . Also, COMB is a RRC configured comb size configuration. For example, COMB is comb 1 configuration, comb 2 configuration, comb 4 configuration, comb 8 configuration, or the like.

In equation (1), mod is a modulo operation. Also, CombOffset is a RRC configured comb offset. Here, F is an offset applied to the RRC configured comb offset. And, CombOffset(k) is the comb offset for the SRS transmission occasion k. According to some aspects, the UE is configured to determine CombOffset(k) based on the COMB (the RRC configured comb size configuration) and the CombOffset (the RRC configured comb offset) using equation 1. In some implementations, CombOffset is a RRC configured comb offset that is configured by, for example, the base station and is sent to the UE.

In some implementations, when the comb offset hopping is supported, the function F (F(mod(k,COMB))—the offset applied to the RRC configured comb offset) can include one or more of sequences including:

{0, 1} for the RRC configured comb 2 configuration,
{0, 3, 2, 1}, {0, 1, 2, 3}, or {0, 2, 1, 3} for the RRC configured comb 4 configuration, and
{0, 1, 2, 3, 4, 5, 6, 7}, {0, 3, 6, 1, 4, 7, 2, 5}, {0, 5, 2, 7, 4, 1, 6, 3}, {0, 7, 6, 5, 4, 3, 2, 1}, or {0, 4, 2, 6, 1, 5, 3, 7} for the RRC configured comb 8 configuration.

However, the aspects of this disclosure are not limited to these examples, and other functions and/or sequence can be used for the function F (F(mod(k,COMB))—the offset applied to the RRC configured comb offset).

According to some implementations, the mod(k,COMB) in the F(mod(k,COMB)) provides an index for the sequence associated with the function. In a non-limiting example, if sequence {0, 1, 2, 3, 4, 5, 6, 7} is used for function F and if mod(k,COMB)=3, then F(mod(k,COMB)) would be 2 (the index 3 in the sequence {0, 1, 2, 3, 4, 5, 6, 7}).

According to some implementation, the base station can configure the UE to use one or more sequences discussed above for the function F (F(mod(k,COMB))—the offset applied to the RRC configured comb offset). For example, the base station can use the RRC message to let the UE know which set to use. For example, for comb 8 configuration, the UE can have multiple choices for the function F. In this example, the base station can let the UE know which set to use for the function F.

Figure 4A:
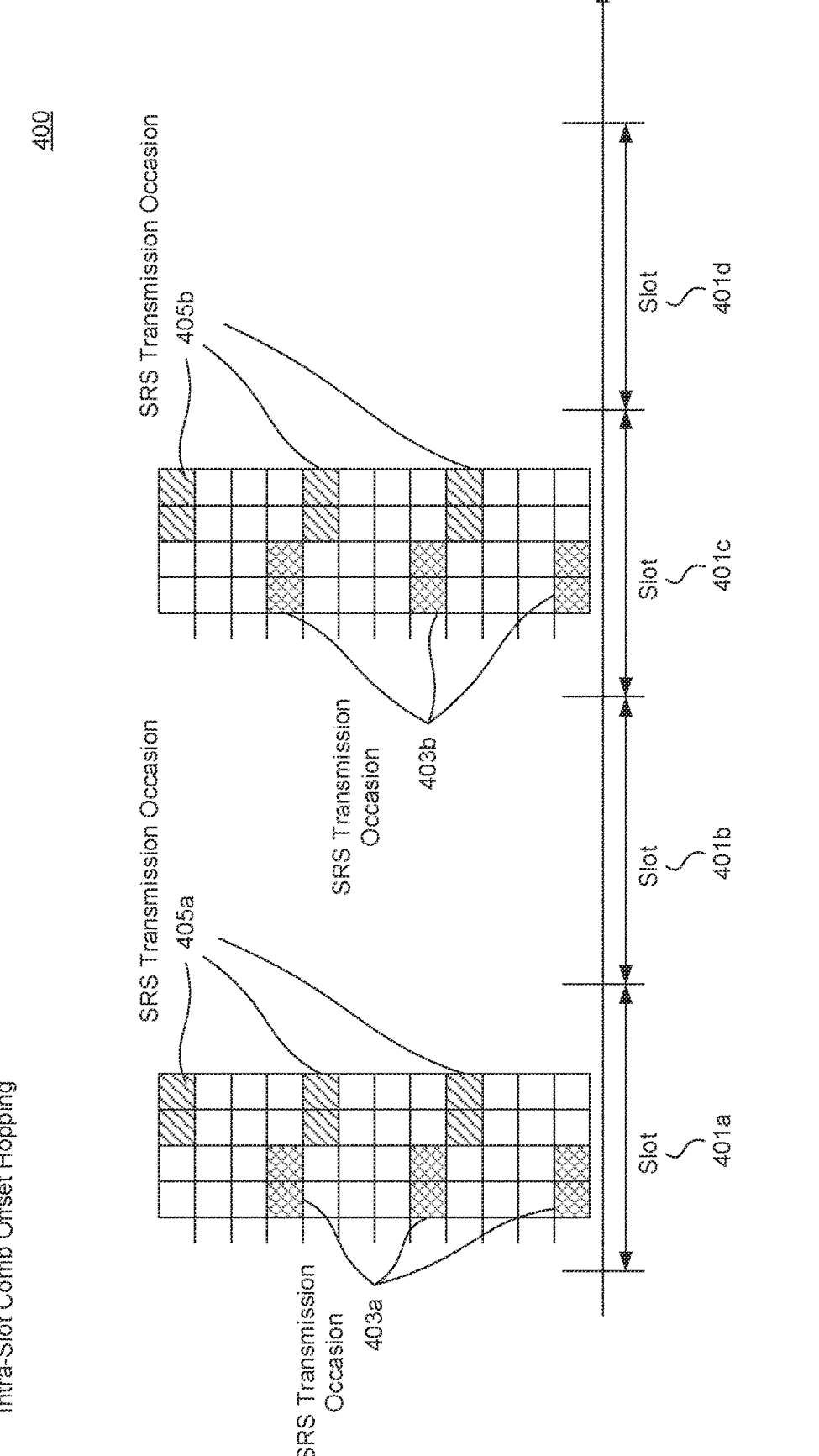
FIG. 4A illustrates an exemplary intra-slot comb offset hopping, according to some aspects of this disclosure.
Figure 4B:
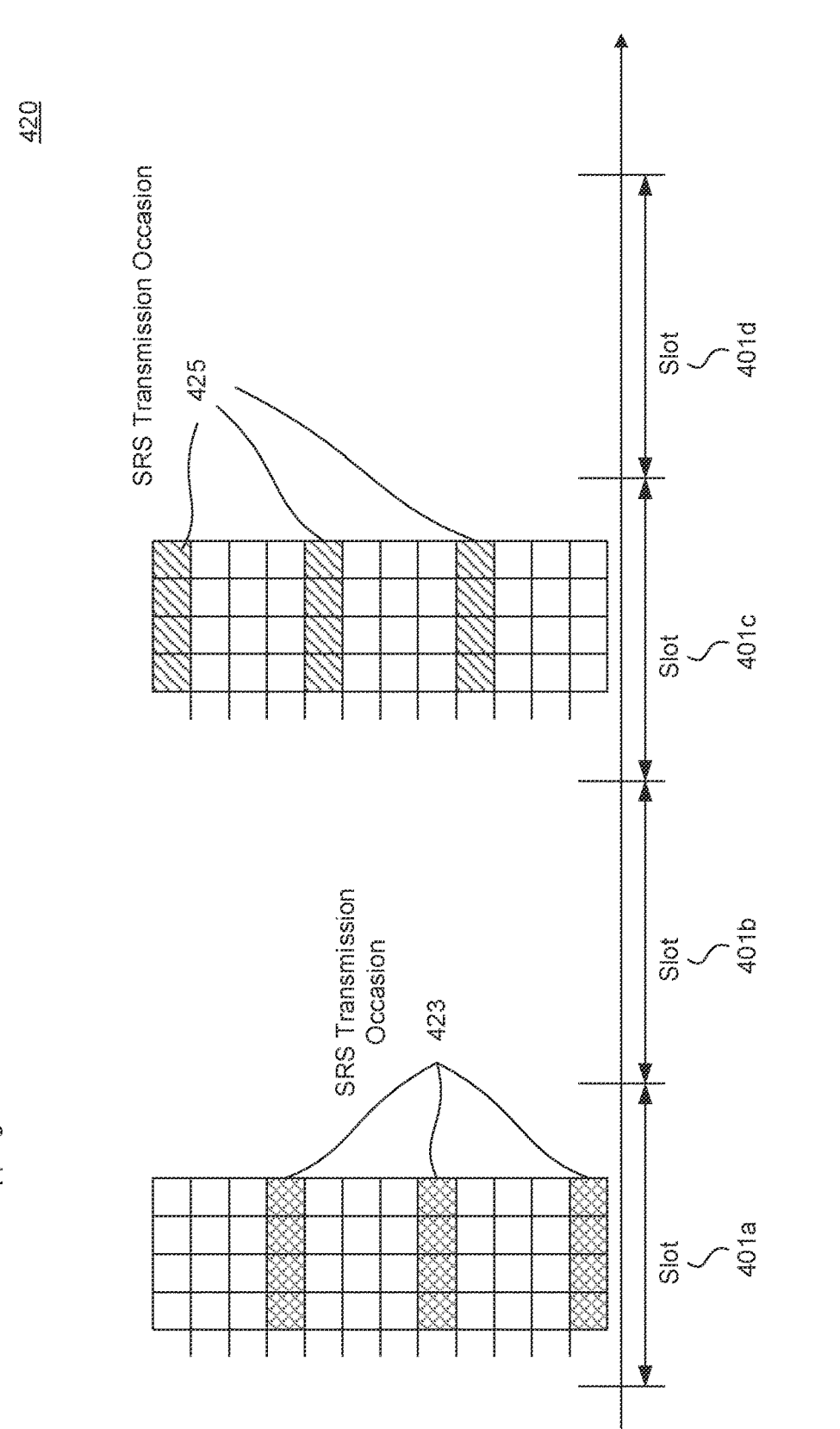
FIG. 4B illustrates an exemplary inter-slot comb offset hopping, according to some aspects of this disclosure.

FIG. 4A illustrates an exemplary intra-slot comb offset hopping 400, according to some aspects of this disclosure. FIG. 4A illustrates four slots 401a-401d, where slots 401a and 401c include SRS transmissions. In this intra-slot comb offset hopping 400, the comb offset hopping is performed within a slot (e.g., slots 401a and 401c). In this example, the SRS transmission occasions 403a and 403b have a first comb offset (e.g., comb offset 0). The SRS transmission occasion 403a has two symbols and SRS transmission occasion 403b also has two symbols.

In this example, the SRS transmission occasions 405a and 405b have a second comb offset (e.g., comb offset 3). Therefore, the comb offset hopping has occurred between the SRS transmission occasion 403a and the SRS transmission occasion 405a (and also between the SRS transmission occasion 403b and the SRS transmission occasion 405b). The SRS transmission occasion 405a has two symbols and SRS transmission occasion 405b also has two symbols.

The number of symbols for each SRS transmission occasion and the number of comb offset hopping in each slot are provided as examples in FIG. 4A and they do not limit the aspects of this disclosure.

According to some implementations, the number of comb offsets used in each slot for intra-slot comb offset hopping can be determined by a number of symbols used for the SRS transmission and a repetition factor. For example, the number of comb offsets used in each slot for intra-slot comb offset hopping can be determined by the number of symbols used for the SRS transmission divided by the repetition factor. In the example of FIG. 4A, the number of symbols used for the SRS transmission is 4 and the repetition factor is 2. Therefore, in this non-limiting example, the number of comb offsets used in each slot for intra-slot comb offset hopping is 2. In some implementations, the number of symbols used for SRS transmission and the repetition factor are configured by the base station and are indicated in a RRC message. For example, the number of symbols used for SRS transmission and the repetition factor can be in an SRS-Resource message.

According to some examples, the number of symbols used for SRS transmission can include 2, 4, 8, 10, 12, and 14. The repetition factor can include a number by which the number of symbols used for SRS transmission is divisible. For example, for the number of symbols used for SRS transmission being 12, the repetition factor can include 1, 2, 3, 4, 6, or 12.

FIG. 4B illustrates an exemplary inter-slot comb offset hopping 420, according to some aspects of this disclosure. FIG. 4B illustrates four slots 401a-401d, where slots 401a and 401c include SRS transmissions. In this inter-slot comb offset hopping 420, the comb offset hopping is performed between slots (e.g., slots 401a and 401c). In this example, the SRS transmission occasion 423 has a first comb offset (e.g., comb offset 0). The SRS transmission occasion 423 have four symbols. In this example, the SRS transmission occasion 425 has a second comb offset (e.g., comb offset 3). Therefore, the comb offset hopping has occurred between the SRS transmission occasion 423 and the SRS transmission occasion 425. The SRS transmission occasion 425 has four symbols.

According to some implementations, the intra-slot comb offset hopping (e.g., FIG. 4A) can be combined with the inter-slot comb offset hopping (e.g., FIG. 4B). In other words, the comb offset can change within each slot. Additionally, the comb offset can change between slots. In a non-limiting example, the comb offset can change from comb offset 0 to comb offset 1 within a first slot. Then, the comb offset can change from comb offset 1 to comb offset 2 in a second slot. The comb offset can change from comb offset 2 to comb offset 3 within the second slot.

According to some implementations, if comb offset hopping is supported, the base station and/or the UE can be configured to determine the SRS transmission occasion (k in equation (1)) for comb offset hopping. For example, for comb offset hopping, the SRS transmission occasion can be defined on the basic time unit that comb offset hops.

In some implementations, for intra-slot comb offset hopping, the SRS transmission occasion (k in equation (1)) can be determined by the number of symbols used for the SRS transmission and the repetition factor. For example, the SRS transmission occasion (k in equation (1)) can be determined by the number of symbols used for the SRS transmission divided by the repetition factor. In the example of FIG. 4A, the number of symbols used for the SRS transmission is 4 and the repetition factor is 2. Therefore, in this non-limiting example, the SRS transmission occasion (k in equation (1)) can be every 2 symbols that is used for the SRS transmission. For example, for FIG. 4A, the SRS transmission occasion 403a can be 0 (k=0), the SRS transmission occasion 405a can be 1 (k=1), the SRS transmission occasion 403b can be 2 (k=2), and the SRS transmission occasion 405b can be 3 (k=3).

In some implementations, for inter-slot comb offset hopping, the SRS transmission occasion (k in equation (1)) can be every slot with the SRS transmission. For example, for FIG. 4B, the SRS transmission occasion 423 can be 0 (k=0) and the SRS transmission occasion 425 can be 1 (k=1).

In some implementations, the SRS transmission occasion (k in equation (1)) can be determined as discussed above but also with consideration of frequency hopping for SRS transmission. In some examples, the SRS transmission occasion (k in equation (1)) can be determined only among SRS symbols/slots (e.g., the SRS transmission occasions) that share the same frequency location. Alternatively, the SRS transmission occasion (k in equation (1)) can be determined only among SRS symbols/slots (e.g., the SRS transmission occasions) that have different frequency locations.

According to some implementations, even if two UEs transmit their respective SRS in the same SRS transmission occasion once, by using offset comb hopping the base station can decrease the probability that the UEs will use the same SRS transmission occasion for UE's following SRS transmissions. In other words, by changing the pattern of the SRS transmissions by comb offset hopping, the probability of collisions of SRSs between UEs can decrease.

FIG. 5 illustrates an example method 500 for a system (for example, a UE) supporting mechanisms for comb offset hopping for SRS interference randomization, according to some aspects of the disclosure. As a convenience and not a limitation, FIG. 5 may be described with regard to elements of FIGS. 1-4. Method 500 may represent the operation of an electronic device (for example, UE 105 of FIG. 1) implementing mechanisms for comb offset hopping for SRS interference randomization. Method 500 may also be performed by system 200 of FIG. 2 and/or computer system 1000 of FIG. 10. But method 500 is not limited to the specific aspects depicted in those figures and other systems may be used to perform the method as will be understood by those skilled in the art. It is to be appreciated that not all operations may be needed, and the operations may not be performed in the same order as shown in FIG. 5.

At 502, a comb offset for each SRS transmission occasion is determined. For example, a UE (for example, the UE 105) can determine a comb offset for each SRS transmission occasion for the UE. For example, the UE can determine a comb offset for each of a plurality SRS transmission occasion for the UE. The comb offsets change between different SRS transmission occasions of the UE. The UE can determine the SRS transmission occasions as discussed above. The UE can determine the comb offset for each SRS transmission occasion for the UE using, for example, equation (1) discussed above.

At 504, a first SRS for a first SRS transmission occasion of the plurality of SRS transmission occasions is generated using the determined comb offset corresponding to the first transmission occasion. For example, the UE can generate the first SRS for the first transmission occasion of the plurality of SRS transmission occasions using the determined comb offset corresponding to the first transmission occasion. At 506, the UE can transmit the first SRS to the base station.

For example, for a first SRS transmission occasion (k=0), the UE determines a first comb offset. The UE uses the first comb offset to generate and transmit its SRS during the first SRS transmission occasion. For a second SRS transmission occasion (k=1), the UE determines a second comb offset different from the first comb offset. The UE uses the second comb offset to generate and transmit its SRS during the second SRS transmission occasion. For a third SRS transmission occasion (k=2), the UE determines a third comb offset different from the second comb offset. The UE uses the third comb offset to generate and transmit its SRS during the third SRS transmission occasion. And so forth as discussed above with respect to FIGS. 3, 4A, and 4B.

In some examples, method 500 further includes determining the comb offset for each SRS transmission occasion a number of times within a slot (e.g., the intra-slot comb offset hopping discussed above). The number of times can be determined by a number of symbols used for SRS transmission divided by a repetition factor. In some examples, the UE is configured to determine the number of symbols used for the SRS transmission and the repetition factor from a RRC message received from the base station.

In some examples, method 500 can further include determining the comb offset for each SRS transmission occasion once in a slot (e.g., the inter-slot comb offset hopping discussed above).

In some examples, method 500 can further include determining the comb offset for each SRS transmission occasion when the plurality of SRS transmission occasions share a same frequency location. Additionally, or alternatively, method 500 can further include determining the comb offset for each SRS transmission occasion when the plurality of SRS transmission occasions have different frequency locations.

In addition to, or alternatively to, the comb offset hopping for frequency domain interference randomization, system 100 of FIG. 1 can be configured to implement code domain interference randomization. In some aspects, the code domain randomization can include using different SRS base sequences for different UEs. Additionally, or alternatively, the code domain interference randomization can include cyclic shift (CS) hopping for each UE.

According to some aspects, the UE (e.g., UE 105) can use SRS base sequences for generating its SRS for transmitting to the base station (e.g., base station 105). In some implementations, the SRS base sequence can include low peak-to-average-power ratio (PAPR) sequences. In some examples, 30 groups of low-PAPR sequences can be defined, where each group can include 2 SRS base sequences (e.g., SRS base sequence 0 and SRS base sequence 1). So, a total of 60 SRS base sequences can be defined. However, the aspects of this disclosure are not limited to this example and can include any other number of groups and/or SRS base sequences.

According to some aspects, the base station can configure and/or allow different UEs use different SRS base sequences (e.g., SRS base sequence hopping). Therefore, if two UEs transmit their SRS using different SRS base sequences but in the same SRS transmission occasion, the base station can be configured to receive and decode the two SRSs because the two SRSs used different SRS base sequences.

Without the SRS base sequence hopping, each UE may use SRS base sequence 0. According to some aspects, by using the SRS base sequence hopping, each UE can use SRS base sequence 0 or SRS base sequence 1. Additionally, or alternatively, by using the SRS base sequence hopping, the UEs can use an SRS base sequence from different SRS base sequence groups (e.g., the groups of low-PAPR sequences).

According to some aspects, the base station can configure (and/or allow) the UE to use the SRS base sequence hopping when the base station has configured the group or sequence hopping to "neither" or "groupHopping" (e.g., groupOrSequenceHopping="neither" or "groupHopping").

In this case, the base station can set the SRS base sequence index in a message (e.g., the SRS-Resource message) to the UE. An exemplary SRS-Resource message with the SRS base sequence index (basesequenceId INTEGER (0 . . . 1), OPTIONAL) is shown below. For example, by setting the SRS base sequence index to 0, the base station can configure the UE to use the SRS base sequence 0. By setting the SRS base sequence index to 1, the base station can configure the UE to user SRS base sequence 1.

```
SRS-Resource ::= SEQUENCE {
srs-ResourceId SRS-ResourceId,
nrofSRS-Ports ENUMERATED {port1, ports2, ports4},
ptrs-PortIndex ENUMERATED {n0, n1} OPTIONAL, -- Need R
...
sequenceId INTEGER (0..1023),
basesequenceId INTEGER (0..1), OPTIONAL
spatialRelationInfo SRS-SpatialRelationInfo
```

The aspects of this disclosure are not limited to these examples, and the base station can use other messages and/or method to configure different UEs to use different SRS base sequences and/or different SRS base sequence groups.

In addition to, or alternatively to, using SRS base sequence hopping, the system 100 of FIG. 1 can use cyclic shift (CS) hopping to achieve code domain interference randomization to reduce the interference between different UEs SRS transmission. On top of the SRS base sequence, cyclic shifts are used to create orthogonal SRS ports for the SRS transmission. According to some implementations, the maximum number of cyclic shifts that a UE can use for its SRSs is a function of the comb size configuration (also referred herein as the comb size). For example, the maximum number of cyclic shifts $$n_{SRS}^{CS,max}$$

for comb 2 configuration (comb size of 2) can be 8. For example, the maximum number of cyclic shifts $$n_{SRS}^{CS,max}$$

for comb 4 configuration (comb size of 4) can be 12. For example, the maximum number of cyclic shifts $$n_{SRS}^{CS,max}$$

for comb 8 configuration (comb size of 8) can be 6.
According to some aspects, there can be $$n_{SRS}^{CS,max}$$

orthogonal SRSs, each SRS containing $$n_{SRS}^{CS,max}$$

entries. In some implementations, the SRS can be constructed by DFT sequences (Discrete Fourier transform). In some implementations, the base station configured the index for the cyclic shift that each UE is to use. For example, the base station can send a message to the UE with the index of the cyclic shift that the UE is use. In one example, the base station can transmit the index of the cyclic shift by RRC in cyclicShift in the SRS-Resource message. The cyclic shift with equal distance of $$n_{SRS}^{CS,max}/N_p$$

is used to create $N_p$ orthogonal SRS ports per comb offset.

According to some aspects, the UE (and/or the base station) can use cyclic shift hopping in addition to the index of the cyclic shift configured by the base station. Therefore, if two UEs are configured with the same cyclic shift by the base station, the UEs can use cyclic shift hopping to change their corresponding cyclic shifts for SRS transmission occasions in order to reduce interferences between SRS transmissions.

Figure 6:
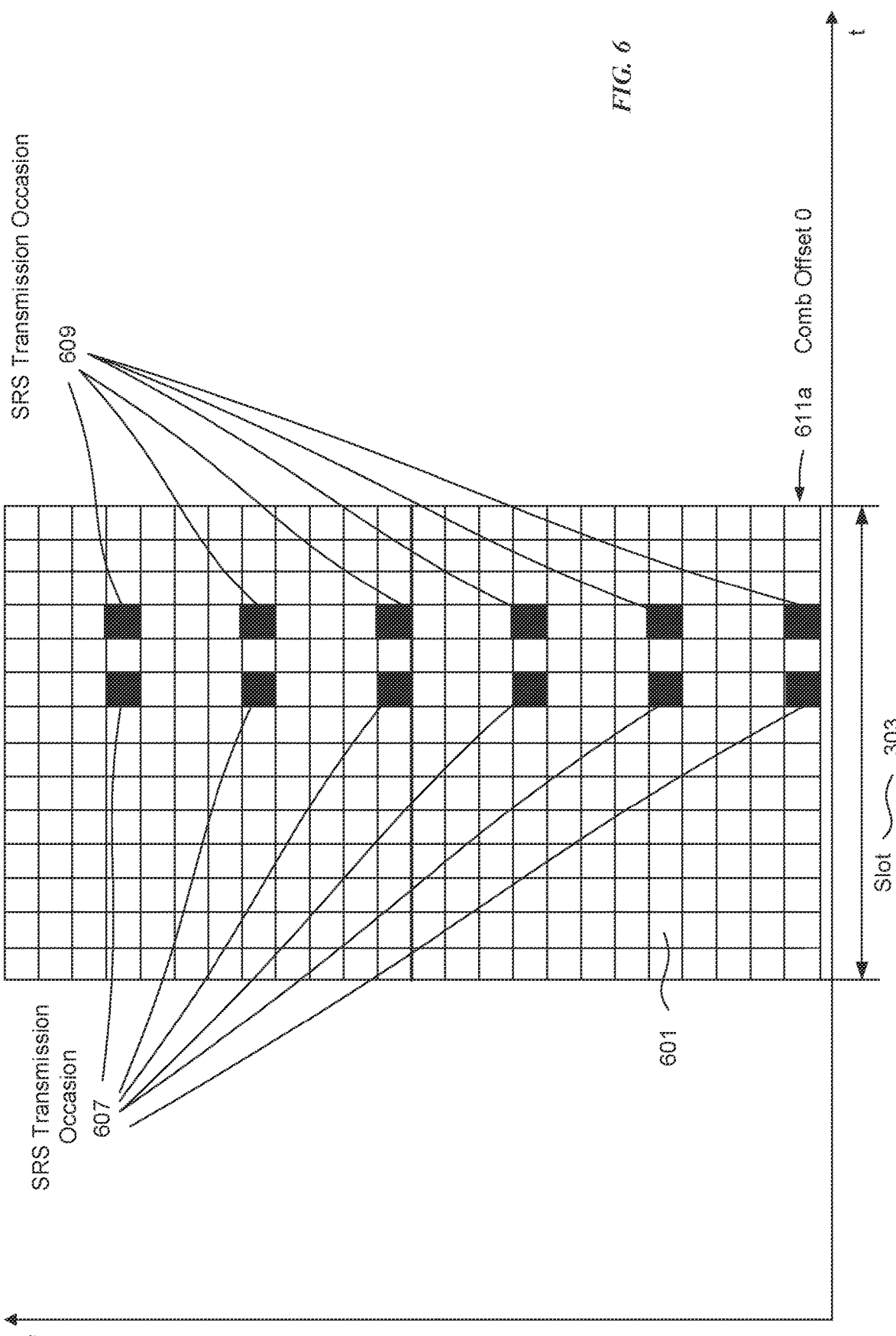
FIG. 6 illustrates an exemplary cyclic shift hopping for SRS interference randomization, according to some aspects of the disclosure.

FIG. 6 illustrates an exemplary cyclic shift hopping for SRS interference randomization, according to some aspects of this disclosure. The cyclic shift hopping for SRS interference randomization can be used for the code domain interference randomization. The cyclic shift hopping of FIG. 6 is illustrated without any comb offset hopping discussed above with respect to FIGS. 3-5. FIG. 6 is illustrated with comb offset 0 611a. However, as noted above, the comb offset hopping and cyclic shift hopping can be combined.

FIG. 6 illustrates a plurality of resource elements 601. According to some aspects, a UE (e.g., the UE 105) can be configured to transmit the SRS at one or more SRS transmission occasions (e.g., SRS resources) 607 and 609. In some implementations, the SRS transmission occasions 607 and 609 are configured by the base station and the configuration parameters are transmitted to the UE for transmitting the SRS. Additionally, or alternatively, the UE is configured to determine one or more parameters of the SRS transmission occasions 607 and 609 as discussed herein. In some implementations, each SRS transmission occasion can include one or more resource elements. The one or more resource elements in the SRS transmission occasion can be associated with the same symbol(s) and distributed over subcarriers based on comb offset.

In current implementations, when the base station configures a cyclic shift for a UE, the base station does not change the cyclic shift for that UE for different SRS transmission occasions. For example, if the base station configures a cyclic shift with index 1 for a first UE and configures the cyclic shift with the same index 1 for a second UE, the first and second UEs will have their SRSs collided if the first and second UEs transmit their SRSs at the same SRS transmission occasions, and the base station does not change the cyclic shift for the first and second UEs. However, the aspects of this disclosure are directed to changing the cyclic shift for each UE for the SRS transmission occasions to reduce the possibility of interferences.

According to some aspects, system 100 is configured to implement cyclic shift hopping for SRS interference randomization for each UE. The cyclic shift hopping for SRS interference randomization can be used for the code domain interference randomization. FIG. 6 illustrates one exemplary cyclic shift hopping for SRS interference randomization for each UE. The exemplary cyclic shift hopping of FIG. 6 is an intra-slot cyclic shift hopping. As discussed in more detail below, FIG. 7B illustrates an exemplary inter-slot cyclic shift hopping.

According to some aspects, the UE and/or the base station are configured to determine (e.g., configure) cyclic shift for each SRS transmission occasion to implement cyclic shift hopping for the UE. The base station can communicate the configured cyclic shifts to the UE so that the UE can use the configured cyclic shift s for transmitting the SRS. In some examples, the base station can use RRC messages to communicate the configured cyclic shift s to the UE. The base station can use other messages to communicate the configured comb offsets to the UE. In some implementations, the base station can communicate the configured cyclic shift s to the UE when the UE is connecting to the base station. Additionally, or alternatively, the base station can communicate the configured cyclic shift to the UE one or more times during the time the UE is connected to the base station.

Alternatively, the UE is configured to determine (e.g., configure) cyclic shift for each SRS transmission occasion to implement cyclic shift hopping for the UE. The UE can use one or more parameters that the UE receives from the base station with the methods discussed herein to determine (e.g., configure) cyclic shift for each SRS transmission occasion to implement comb offset hopping.

In the exemplary cyclic shift hopping of FIG. 6, a comb 4 configuration (comb size 4) is used with a maximum number of cyclic shifts 12. In this example, orthogonal SRSs are generated with a distance of 2 cyclic shifts between them. However, the aspects of this disclosure can include other comb sizes, and other number of orthogonal sequences. In some examples, the transmission occasion 607 is for illustration purposes. The SRS at the SRS transmission occasion 607 contains 6 orthogonal ports with equal distance of 2 cyclic shifts, and can use a cyclic shift with index 1, 3, 5, 7, 9, 11 for each of the 6 SRS orthogonal ports, respectively. In another example, orthogonal SRS ports can be generated with a distance of 3 cyclic shifts between them. In this example, the SRS at the SRS transmission occasion 607 contains 4 orthogonal SRS ports with equal distance of 3 cyclic shifts, and, can use a cyclic shift with index 1, 4, 7, 10 for each of the 4 orthogonal SRS ports, respectively.

For the transmission occasion 609, which is for illustration purposes, the UE can use cyclic shift hopping to use different cyclic shifts compared to the transmission occasion 607. For example, by using cyclic shift hopping, the SRS at the SRS transmission occasion 609 can use a cyclic shift with index 2, 4, 6, 8, 10, 0 for each of the 6 orthogonal SRS ports, respectively. In another example, orthogonal SRS ports can be generated with a distance of 3 cyclic shifts between them. In this example, the SRS at the SRS transmission occasion 609 can use a cyclic shift with index 2, 5, 8, 11 for each of the 4 orthogonal SRS ports, respectively.

Therefore, by changing the cyclic shift for each UE for different SRS transmission occasions, the probability of interference between different UEs' SRS transmission decreases.

According to some aspects, the cyclic shift for each SRS transmission occasion can be determined as:

$$CyclicShift(k) =$$ 
Equation (2)

$$\mathrm{mod}\left(CyclicShift + F\left(\mathrm{mod}\left(k, n_{SRS}^{CS,max}\right)\right), n_{SRS}^{CS,max}\right).$$

Here, k is a non-negative integer indicating the SRS transmission occasion. For example, k=0, 1, 2, 3, . . . . Also, $$n_{SRS}^{CS,max}$$

is the maximum number of cyclic shifts derived from a RRC configured comb size configuration. For example, COMB is comb 1 configuration, comb 2 configuration, comb 4 configuration, comb 8 configuration, or the like.

In equation (2), mod is a modulo operation. Also, Cyclic-Shift is a RRC configured cyclic shift. Here, F is an offset applied to the RRC configured cyclic shift. And, CyclicShift (k) is the cyclic shift for the SRS transmission occasion k. According to some aspects, the UE is configured to determine CyclicShift(k) based on the COMB (the RRC configured comb size configuration—e.g., based on the maximum number of cyclic shifts derived from a RRC configured comb size configuration) and the CyclicShift (the RRC configured cyclic shift) using equation (2). In some implementations, CyclicShift is a RRC configured cyclic shift that is configured by, for example, the base station and is sent to the UE.

In some implementations, when the cyclic shift hopping is supported, the function $$F\left(F\left(\mathrm{mod}\left(k, n_{SRS}^{CS,max}\right)\right)\right)$$

—the offset applied to the RRC configured cyclic shift) can include one or more of sequences including:
{0, 1, 2, 3, 4, 5}, 10, 2, 4, 1, 3, 51, 10, 3, 1, 4, 2, 51, or {0, 5, 4, 3, 2, 1} for a maximum number of cyclic shifts of 6

$$\left(n_{SRS}^{CS,max} = 6\right).$$

{0, 1, 2, 3, 4, 5, 6, 7}, {0, 4, 2, 6, 1, 5, 3, 7}, {0, 3, 6, 1, 4, 7, 2, 5}, {0, 5, 2, 7, 4, 1, 6, 3}, {0, 7, 6, 5, 4, 3, 2, 1}, or {0, 4, 2, 6, 1, 5, 3, 7} for a maximum number of cyclic shifts of 8

$$\left(n_{SRS}^{CS,max} = 8\right).$$

{0, 1, 2, 3, 4, 5, 6, 7, 8, 9, 10, 11}, {0, 6, 3, 9, 2, 8, 4, 10, 1, 7, 5, 11}, {0, 3, 6, 9, 1, 4, 7, 10, 2, 5, 8, 11}, {0, 5, 10, 3, 8, 1, 6, 11, 4, 9, 2, 7}, {0, 7, 2, 9, 4, 11, 6, 1, 8, 3, 10, 5}, {0, 11, 10, 9, 8, 7, 6, 5, 4, 3, 2, 1} for a maximum number of cyclic shifts of 12

$$\left(n_{SRS}^{CS,max} = 12\right).$$

However, the aspects of this disclosure are not limited to these examples, and other functions and/or sequence can be used for the function $$F\left(F\left(\mathrm{mod}\left(k, n_{SRS}^{CS,max}\right)\right)\right)$$

—the offset applied to the RRC configured cyclic shift).
According to some implementations, the $$\mathrm{mod}\big(k,\, n_{SRS}^{CS,max}\big)$$

in the $$F\big(\mathrm{mod}\big(k,\, n_{SRS}^{CS,max}\big)\big)$$

provides an index for the sequence associated with the function. In a non-limiting example, if sequence {0, 1, 2, 3, 4, 5, 6, 7} is used for function F and if $$\mathrm{mod}\big(k,\, n_{SRS}^{CS,max}\big) = 3,$$

then $$F\big(\mathrm{mod}\big(k,\, n_{SRS}^{CS,max}\big)\big)$$

would be 2 (the index 3 in the sequence {0, 1, 2, 3, 4, 5, 6, 7}).

According to some implementation, the base station can configure the UE to use one or more sequences discussed above for the function $$F\big(F\big(\mathrm{mod}\big(k,\, n_{SRS}^{CS,max}\big)\big)\big)$$

—the offset applied to the RRC configured cyclic shift). For example, the base station can use the RRC message to let the UE know which set to use. For example, for comb 8 configuration, the UE can have multiple choices for the function F. In this example, the base station can let the UE know which set to use for the function F.

Figure 7A:
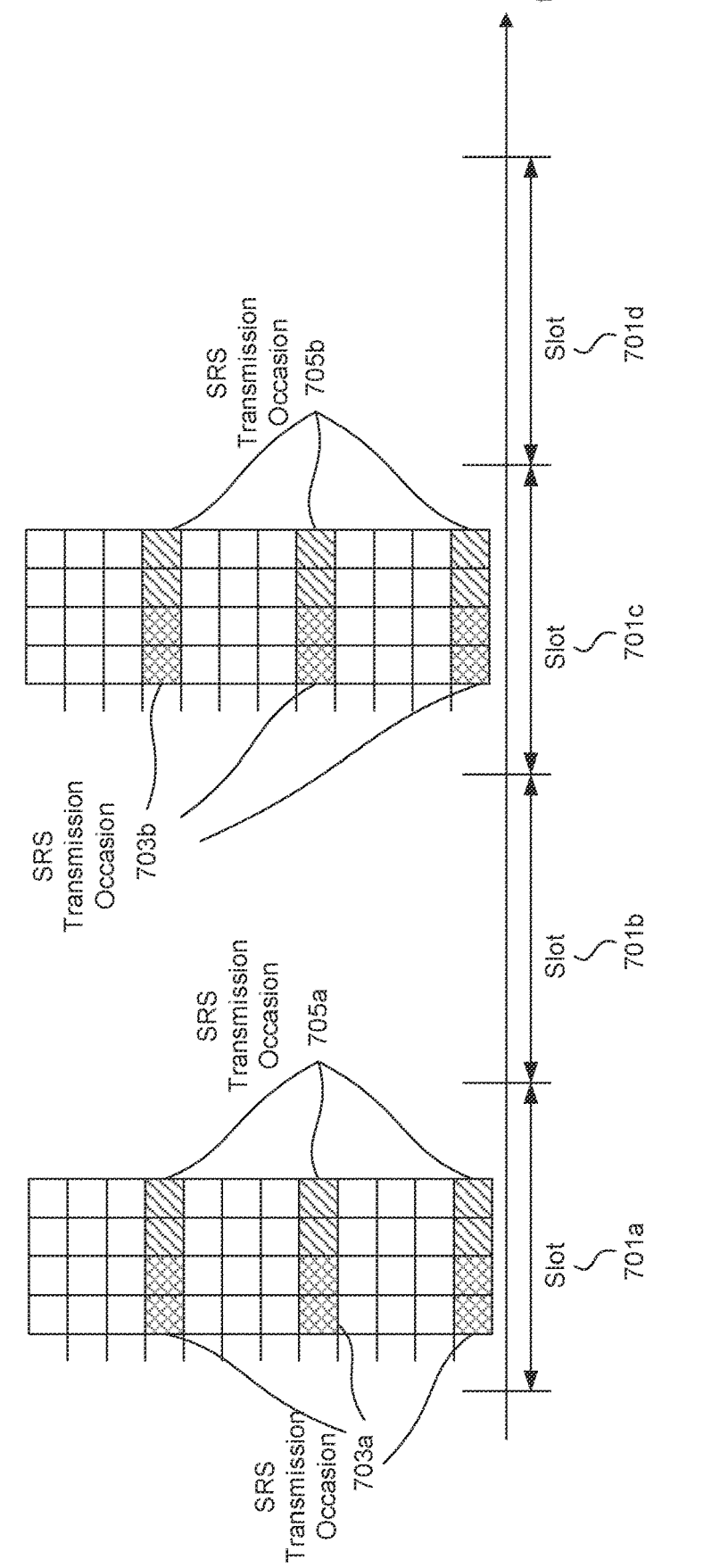
FIG. 7A illustrates an exemplary intra-slot cyclic shift hopping, according to some aspects of this disclosure.
Figure 7B:
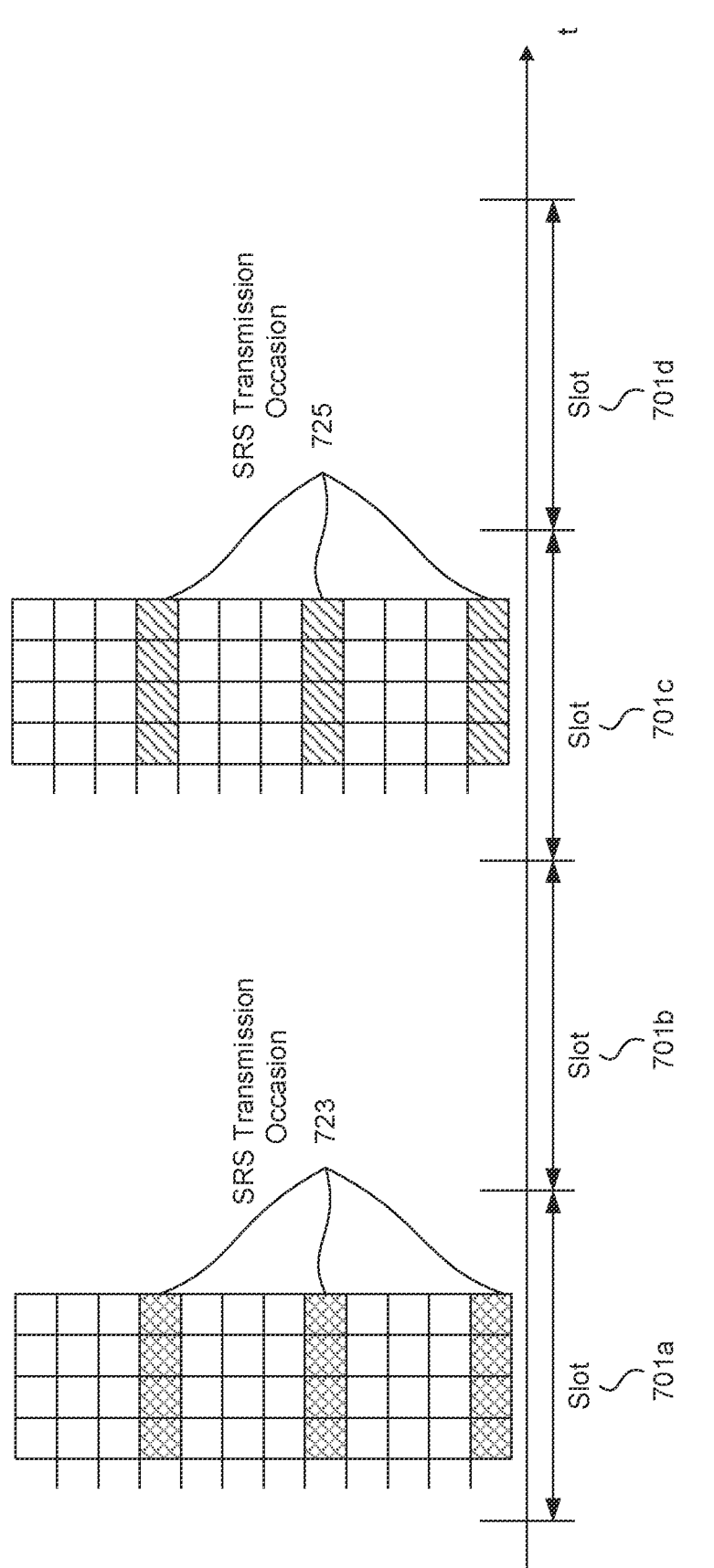
FIG. 7B illustrates an exemplary inter-slot cyclic shift hopping, according to some aspects of this disclosure.

FIG. 7A illustrates an exemplary intra-slot cyclic shift hopping 700, according to some aspects of this disclosure. FIG. 7A illustrates four slots 701a-701d, where slots 701a and 701c include SRS transmissions. In this intra-slot cyclic shift hopping 700, the cyclic shift hopping is performed within a slot (e.g., slots 701a and 701c). In this example, the SRS transmission occasions 703a and 703b have a first cyclic shift (e.g., start with a cyclic shift with index 0). The SRS transmission occasion 703a has two symbols and SRS transmission occasion 703b also has two symbols.

In this example, the SRS transmission occasions 705a and 705b have a second cyclic shift (e.g., start with a cyclic shift with index 5). Therefore, the cyclic shift hopping has occurred between the SRS transmission occasion 703a and the SRS transmission occasion 705a (and also between the SRS transmission occasion 703b and the SRS transmission occasion 705b). The SRS transmission occasion 705a has two symbols and SRS transmission occasion 705b also has two symbols.

The number of symbols for each SRS transmission occasion and the number of cyclic shift hopping in each slot are provided as examples in FIG. 7A and they do not limit the aspects of this disclosure.

According to some implementations, the number of cyclic shifts used in each slot for intra-slot cyclic shift hopping can be determined by a number of symbols used for the SRS transmission and a repetition factor. For example, the number of cyclic shifts used in each slot for intra-slot cyclic shift hopping can be determined by the number of symbols used for the SRS transmission divided by the repetition factor. In the example of FIG. 7A, the number of symbols used for the SRS transmission is 4 and the repetition factor is 2. Therefore, in this non-limiting example, the number of cyclic shifts used in each slot for intra-slot comb offset hopping is 2. In some implementations, the number of symbols used for SRS transmission and the repetition factor are configured by the base station and are indicated in a RRC message. For example, the number of symbols used for SRS transmission and the repetition factor can be in an SRS-Resource message.

FIG. 7B illustrates an exemplary inter-slot cyclic shift hopping 720, according to some aspects of this disclosure. FIG. 7B illustrates four slots 701a-701d, where slots 701a and 701c include SRS transmissions. In this inter-slot cyclic shift hopping 720, the cyclic shift hopping is performed between slots (e.g., slots 701a and 701c). In this example, the SRS transmission occasion 723 has a first cyclic shift (e.g., start with a cyclic shift with index 0). The SRS transmission occasion 723 has four symbols. In this example, the SRS transmission occasion 725 has a second cyclic shift (e.g., starts with a cyclic shift with index 5). Therefore, the cyclic shift hopping has occurred between the SRS transmission occasion 723 and the SRS transmission occasion 725. The SRS transmission occasion 725 has four symbols.

According to some implementations, the intra-slot cyclic shift hopping (e.g., FIG. 7A) can be combined with the inter-slot cyclic shift hopping (e.g., FIG. 7B). In other words, the cyclic shift can change within each slot. Additionally, the cyclic shift can change between slots. Similarly, the cyclic shift hopping of FIGS. 7A-7B can be combined with comb offset hopping of FIGS. 4A-4B.

According to some implementations, if cyclic shift hopping is supported, the base station and/or the UE can be configured to determine the SRS transmission occasion (k in equation (2)) for cyclic shift hopping. For example, for cyclic shift hopping, the SRS transmission occasion can be defined on the basic time unit that cyclic shift hops. According to some implementations, the base station and/or the UE can be configured to determine the SRS transmission occasion (k in equation (2)) for cyclic shift hopping in the same manner discussed above with respect to the base station and/or the UE determining the SRS transmission occasion (k in equation (1)) for comb offset hopping.

Figure 8:
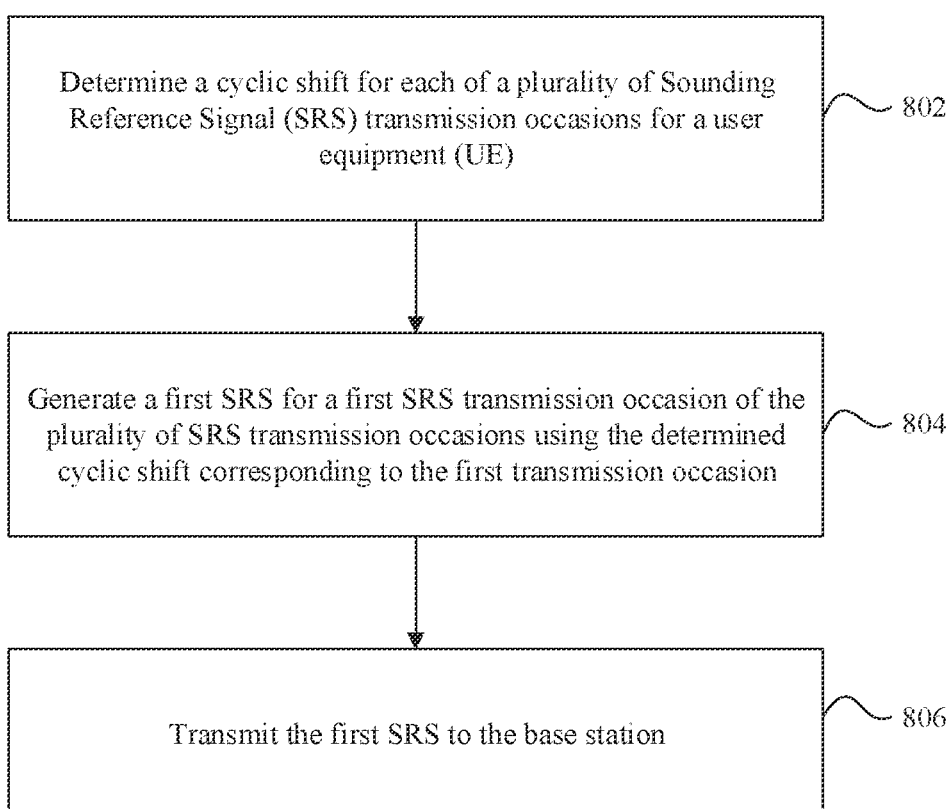
FIG. 8 illustrates an example method for a system (for example, a UE) supporting mechanisms for cyclic shift hopping for SRS interference randomization, according to some aspects of the disclosure.

FIG. 8 illustrates an example method 800 for a system (for example, a UE) supporting mechanisms for cyclic shift hopping for SRS interference randomization, according to some aspects of the disclosure. As a convenience and not a limitation, FIG. 8 may be described with regard to elements of FIGS. 1-7. Method 800 may represent the operation of an electronic device (for example, UE 105 of FIG. 1) implementing mechanisms for cyclic shift hopping for SRS interference randomization. Method 800 may also be performed by system 200 of FIG. 2 and/or computer system 1000 of FIG. 10. But method 800 is not limited to the specific aspects depicted in those figures and other systems may be used to perform the method as will be understood by those skilled in the art. It is to be appreciated that not all operations may be needed, and the operations may not be performed in the same order as shown in FIG. 8.

At 802, a cyclic shift for each SRS transmission occasion is determined. For example, a UE (for example, the UE 105) can determine a cyclic shift for each SRS transmission occasion for the UE. For example, the UE can determine a cyclic shift for each of a plurality SRS transmission occasion for the UE. The cyclic shifts change between different SRS transmission occasions of the UE. The UE can determine the SRS transmission occasions as discussed above. The UE can determine the cyclic shift for each SRS transmission occasion for the UE using, for example, equation (2) discussed above. According to some aspects, the UE determines the cyclic shift for each SRS transmission occasion at different symbols (e.g., for different time instances) for the UE. The cyclic shifts change between different SRS transmission occasions at different symbols (e.g., for different time instances) of the UE.

At 804, a first SRS for a first SRS transmission occasion of the plurality of SRS transmission occasions is generated using the determined cyclic shift corresponding to the first transmission occasion. For example, the UE can generate the first SRS for the first transmission occasion of the plurality of SRS transmission occasions using the determined cyclic shift corresponding to the first transmission occasion. At 806, the UE can transmit the first SRS to the base station.

For example, for a first SRS transmission occasion (k=0), the UE determines a first cyclic shift (e.g., the first SRS transmission occasion starts with a cyclic shift with a first index). The UE uses the first cyclic shift to generate and transmit its SRS during the first SRS transmission occasion (e.g., during a first symbol). For a second SRS transmission occasion (k=1), the UE determines a second cyclic shift (e.g., the second SRS transmission occasion starts with a cyclic shift with a second index) different from the first cyclic shift. The UE uses the second cyclic shift to generate and transmit its SRS during the second SRS transmission occasion (e.g., during a second symbol). For a third SRS transmission occasion (k=2), the UE determines a third cyclic shift (e.g., the third SRS transmission occasion starts with a cyclic shift with a third index) different from the second cyclic shift. The UE uses the third cyclic shift to generate and transmit its SRS during the third SRS transmission occasion (e.g., during a third symbol). And so forth as discussed above with respect to FIGS. 6, 7A, and 7B.

In some examples, method 800 further includes determining the cyclic shift for each SRS transmission occasion a number of times within a slot (e.g., the intra-symbol cyclic shift hopping discussed above). The number of times can be determined by a number of symbols used for SRS transmission divided by a repetition factor. In some examples, the UE is configured to determine the number of symbols used for the SRS transmission and the repetition factor from a RRC message received from the base station.

In some examples, method 800 can further include determining the cyclic shift for each SRS transmission occasion once in a slot (e.g., the inter-symbol cyclic shift hopping discussed above).

In some examples, method 800 can further include determining the cyclic shift for each SRS transmission occasion when the plurality of SRS transmission occasions share a same frequency location. Additionally, or alternatively, method 800 can further include determining the cyclic shift for each SRS transmission occasion when the plurality of SRS transmission occasions have different frequency locations.

According to some aspects, method 800 can further include determining an SRS base sequence from a message from the base station and using the determined SRS base sequence to generate the SRS. For example, the UE can receive a message (e.g., a RRC message and/or an SRS-Resource message) from the base station that indicates an SRS base sequence index. The UE can determine the SRS base sequence from the SRS base sequence index from the received message. The UE can use the determined SRS base sequence for generating and transmitting its SRS.

In addition to, or alternatively to, the comb offset hopping for frequency domain interference randomization, the SRS base sequence hopping for code domain interference randomization, and the cyclic shift hopping for code domain interference randomization, system 100 of FIG. 1 can be configured to implement power control for SRS interference randomization.

According to some aspects, and as discussed with respect to FIG. 1, the UE (e.g., the UE 105) can communicate with two or more TRPs (e.g., the TRPs 101). For example, the UE can communicate through the TRPs 101 with the base station 107. According to some aspects, the TRPs 101*a* and/or 101*b* can be coupled with and/or controlled by the base station 107. Additionally, or alternatively, the TRPs 101*a* and/or 101*b* can be part of the base station 107. For example, the TRP 101 can include antenna arrays (e.g., with one or more antenna elements) available to the base station 107 and located at a specific geographical location. In some implementations, each TRP 101 can be part of (and/or be coupled with and controlled by) its corresponding base station. However, the aspects of this disclosure are not limited to these examples and the TRP 101 and the base station 107 can have other connections and/or relations. Also, although two TRPs 101*a* and 101*b* are illustrated in FIG. 1, system 100 can include any number of TRPs (e.g., 2, 3, 4, or the like number of TRPs.)

According to some aspects, the base station (e.g., the base station 107) can configure the SRS power control parameters. The base station can transmit the configured SRS power control parameters to the UE using one or more messages. For example, the base station can transmit the configured SRS power control parameters to the base station using one or more RRC messages. In some examples, the base station can transmit the configured SRS power control parameters to the UE using one or more SRS-ResourceSet messages (also referred to as SRS-ResourceSet parameter). In some examples, each SRS-ResourceSet message can include one or more SRS-Resource messages. In other words, the SRS power control parameters in the SRS-ResourceSet message can be for one or more SRSs, one or more SRS resources, and one or more SRS transmission occasions.

However, when a UE is communicating with multiple TRPs, there may be different path losses between the UE and the TRPs. Therefore, the UE may need to use different powers for transmitting different SRSs to the TRPs. The current implementation of SRS power control parameters do not consider these scenarios. Some aspects of this disclosure are directed to systems and method to implement power control for SRS transmissions to multiple TRPs.

According to some aspects, the SRS power control parameters can include, but are not limited to, one or more of Open Loop Power Control (OPLC) pathloss compensation factor (also referred to herein as alpha), OLPC desired received power at the base station's receiver (or at the TRP's receiver) (also referred to herein as p0), and OLPC pathloss estimate reference signals (also referred to herein as pathlossReferenceRS).

According to some aspects, when the UE receives the SRS power control parameters configured by, and transmitted by, the base station, the UE can determine the power the UE will use to transmit its SRS to a TRP. For example, based on the OLPC desired received power at the base station's receiver and the OLPC pathloss compensation factor, the UE can determine the amount of the transmission power to use to transmit the SRS to the base station based on the pathloss estimate. In a non-limiting example, if the OLPC desired received power at the base station's receiver is –80 dB and the OLPC pathloss compensation factor is 1, and the pathloss estimate is 100 dB, the UE can transmit its SRS at 20 dB (100 dB-80 dB). However, the UE can use other methods to calculate the desired power based on the configured SRS power control parameters.

Figure 9A:
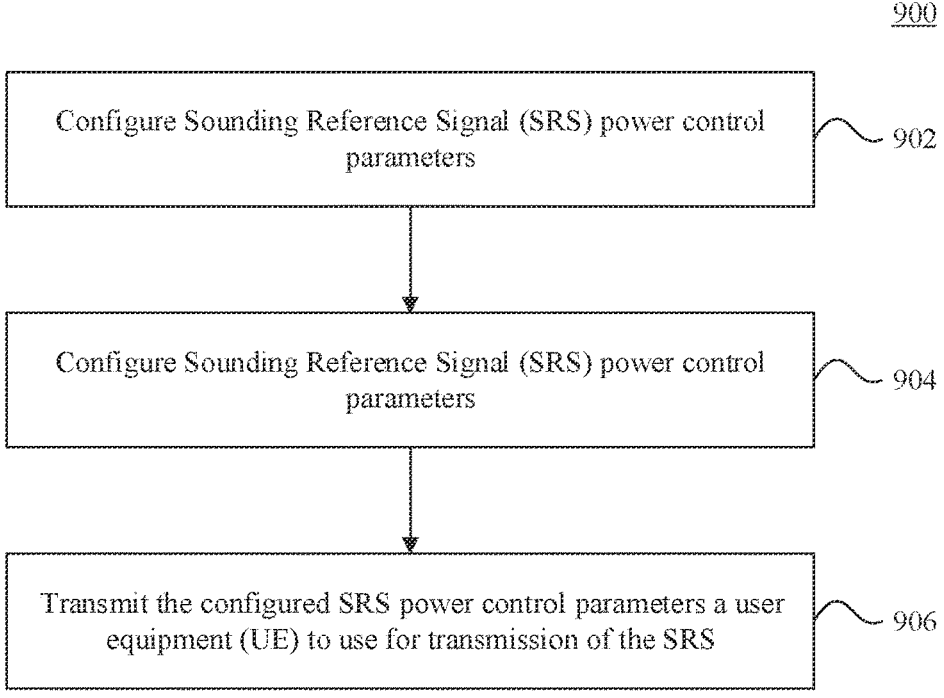
FIG. 9A illustrates an example method for a system (for example, a base station) supporting mechanisms for SRS power control for SRS interference randomization, according to some aspects of the disclosure.

FIG. 9A illustrates an example method 900 for a system (for example, a base station) supporting mechanisms for SRS power control for SRS interference randomization, according to some aspects of the disclosure. As a convenience and not a limitation, FIG. 9A may be described with regard to elements of FIGS. 1-8. Method 900 may represent the operation of an electronic device (for example, the base station 107 of FIG. 1) implementing mechanisms for SRS power control for SRS interference randomization. Method 900 may also be performed by system 200 of FIG. 2 and/or computer system 1000 of FIG. 10. But method 900 is not limited to the specific aspects depicted in those figures and other systems may be used to perform the method as will be understood by those skilled in the art. It is to be appreciated that not all operations may be needed, and the operations may not be performed in the same order as shown in FIG. 9A.

At 902, the base station can control a first Transmission Reception Point (TRP) and a second TRP that are associated with the base station.

At 904, one or more SRS power control parameters are determined. For example, the base station determines the SRS power control parameters for the UE to use.

According to some aspects, the base station configures the SRS power control parameters per SRS resource in the same SRS resource set. As discussed above, an SRS resource set (e.g., SRS-ResourceSet message) can include parameters for one or more SRS resource (e.g., SRS-Resource message). An SRS resource can include a resource element (e.g., the resource element 301 of FIG. 3). Additionally, or alternatively, the SRS resource can include a resource element that can be used for SRS transmission.

In these examples, the base station can configure one or more SRS power control parameters for each SRS resource in the same SRS resource set. According to some aspects, the base station can configure the one or more SRS power control parameters for each TRP for each SRS resource in the same SRS resource set. In other words, the base station can configure the one or more SRS power control parameters for independent TRPs for independent SRS resources in the same SRS resource set. The one or more SRS power control parameters can include one or more of the OPLC pathloss compensation factor, the OLPC desired received power at the base station's receiver, and the OLPC pathloss estimate reference signals.

In a non-limiting example, if the SRS resource set includes two SRS resources and the base station is coupled to two TRPs, the base station can configure the SRS power control parameters for the first TRP in the first SRS resource and can configure the SRS power control parameters for the second TRP in the second SRS resource. The SRS power control parameters for the first TRP can be different from the SRS power control parameters for the second TRP.

In these examples, if one (or more) of the SRS power control parameters are not configured for an SRS resource (or for a TRP for the SRS resource), the UE can use that SRS power control parameter is defined for the SRS resource set. In this case, the base station does not repeat one or more parameters that are the same for the SRS resources and the TRPs. In a non-limiting example, the base station can configure different OLPC pathloss estimate reference signals for different TRPs in different SRS resources, but the OPLC pathloss compensation factor and the OLPC desired received power are not configured per SRS resource. In this example, the UE can use the OPLC pathloss compensation factor and the OLPC desired received power as defined for the SRS resource set for all the TRPs. The UE can use the OLPC pathloss estimate reference signals specific for each TRP.

According to some aspects, the base station configures additional SRS power control parameters for additional TRPs in the same SRS resource set. The additional SRS power control parameters can include one or more of the OPLC pathloss compensation factor, the OLPC desired received power at the base station's receiver, and the OLPC pathloss estimate reference signals. In these implementations, the base station can configure a first set of SRS power control parameters in the SRS resource set. The UE can use this first set of SRS power control parameters for all the TRPs unless additional SRS power control parameters are configured for different TRPs. Therefore, if additional SRS power control parameters are not configured for a TRP, the UE uses the first set of SRS power control parameters for that TRP. In a non-limiting example where the UE is communicating with two TRPs, the first set of SRS power control parameters is configured for the first TRP in the SRS resource set. The UE can use any additional SRS power control parameters for the second TRP. The additional SRS power control parameters are different from the first set of SRS power control parameters configured for the first TRP, according to some aspects. If one or more additional SRS power control parameters are not configured, the UE will use those parameters from the first set of SRS power control parameters for the second TRP.

At 906, the configured one or more SRS power control parameters are transmitted to the UE for use in transmission by the UE of an SRS to the first TRP and/or the second TRP. For example, the base station transmits the configured one or more SRS power control parameters to the UE directly and/or through the TRP(s). The UE can use the configured one or more SRS power control parameters to determine the transmission power to use for transmitting SRSs to the base station and/or the TRPs.

Figure 9B:
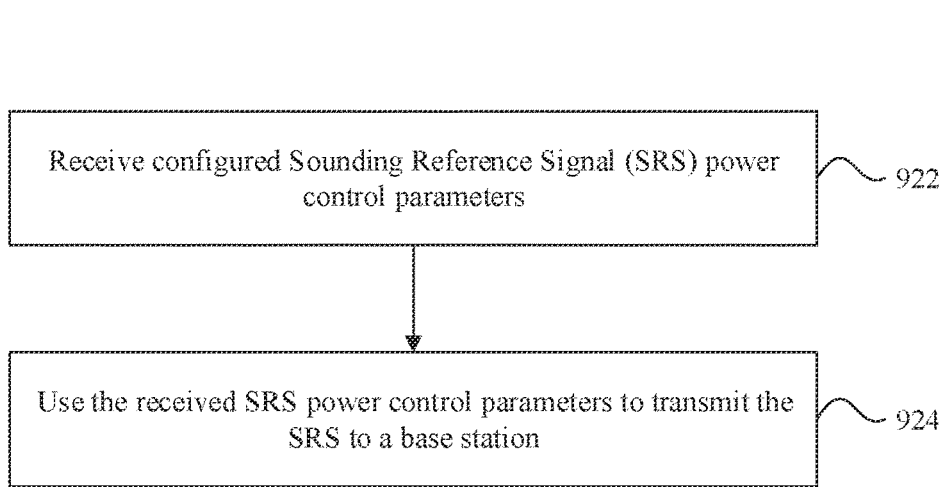
FIG. 9B illustrates an example method for a system (for example, a UE) supporting mechanisms for SRS power control for SRS interference randomization, according to some aspects of the disclosure.

FIG. 9B illustrates an example method 920 for a system (for example, a UE) supporting mechanisms for SRS power control for SRS interference randomization, according to some aspects of the disclosure. As a convenience and not a limitation, FIG. 9B may be described with regard to elements of FIGS. 1-9A. Method 920 may represent the operation of an electronic device (for example, the UE 105 of FIG. 1) implementing mechanisms for SRS power control for SRS interference randomization. Method 920 may also be performed by system 200 of FIG. 2 and/or computer system 1000 of FIG. 10. But method 920 is not limited to the specific aspects depicted in those figures and other systems may be used to perform the method as will be understood by those skilled in the art. It is to be appreciated that not all operations may be needed, and the operations may not be performed in the same order as shown in FIG. 9B.

At 922, one or more configured SRS power control parameters are received at a UE. For example, the UE receives a message (e.g., a RRC message and/or an SRS-ResourceSet message) from the base station that includes the one or more SRS power control parameters that are configured by the base station. The UE can receive the message directly and/or through one or more TRPs. The one or more SRS power control parameters that are configured by the base station are discussed above, for example, with respect to FIG. 9A.

At 924, the UE can use the received one or more SRS power control parameters to determine the transmission power to use for transmitting SRSs to the base station and/or the TRPs. According to some aspects, for each SRS resource/SRS resource set, if independent SRS power control parameters are configured for different TRP, the UE can calculate the desired SRS transmission power (transmission power to transmit the SRS) for each TRP based on the corresponding SRS power control parameter(s).

In some implementations, the UE can use the highest desired SRS transmission power among multiple TRPs as an actual SRS transmission power for transmitting it SRS(s). For example, the UE can calculate the SRS transmission power for each one of the multiple TRPs. Then, the UE can determine the SRS transmission power with the highest value. The UE can use the determined highest SRS transmission power to transmit SRSs for the multiple TRPs. In other words, the UE uses the same SRS transmission power for the multiple TRPs. In some aspects, the UE determines and uses the highest SRS transmission power for each SRS resource.

In some implementations, the UE can use the lowest desired SRS transmission power among multiple TRPs as an actual SRS transmission power for transmitting it SRS(s). For example, the UE can calculate the SRS transmission power for each one of the multiple TRPs. Then, the UE can determine the SRS transmission power with the lowest value. The UE can use the determined lowest SRS transmission power to transmit SRSs for the multiple TRPs. In other words, the UE uses the same SRS transmission power for the multiple TRPs. In some aspects, the UE determines and uses the lowest SRS transmission power for each SRS resource.

In some implementations, the UE can use the average (e.g., mean/median) desired SRS transmission power among multiple TRPs as an actual SRS transmission power for transmitting it SRS(s). For example, the UE can calculate the SRS transmission power for each one of the multiple TRPs. Then, the UE can determine the SRS transmission power with the average value. The UE can use the determined average SRS transmission power to transmit SRSs for the multiple TRPs. In other words, the UE uses the same SRS transmission power for the multiple TRPs. In some aspects, the UE determines and uses the average (e.g., mean/median) SRS transmission power for each SRS resource.

However, the aspects of this disclosure are not limited to these examples, and the UE can use other method to determine the SRS transmission power.

Figure 10:
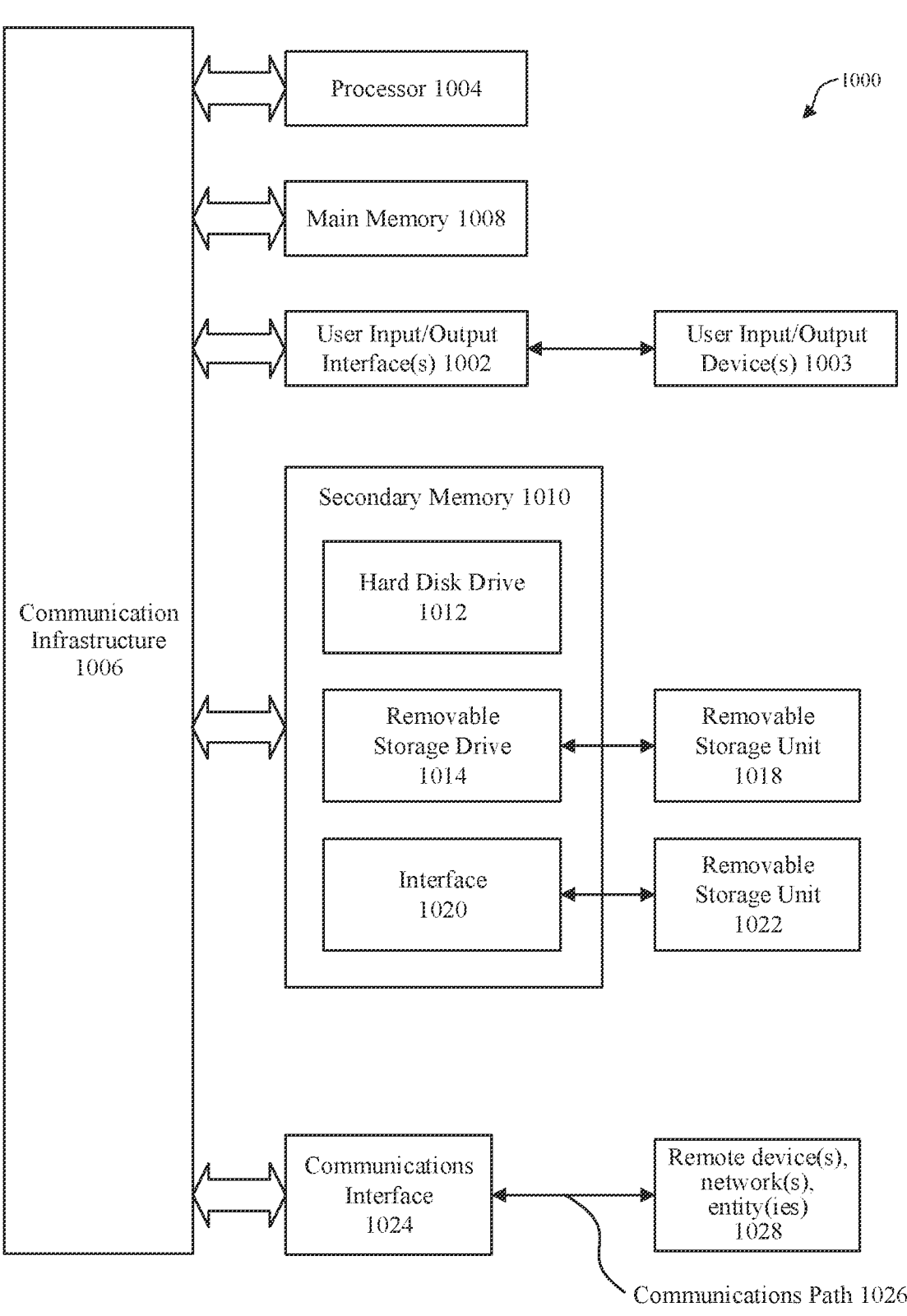
FIG. 10 is an example computer system that can be used for implementing some aspects or portion(s) thereof.

Various aspects can be implemented, for example, using one or more computer systems, such as computer system 1000 shown in FIG. 10. Computer system 1000 can be any well-known computer capable of performing the functions described herein such as devices 101, 105, 107 of FIG. 1, and/or 200 of FIG. 2. Computer system 1000 includes one or more processors (also called central processing units, or CPUs), such as a processor 1004. Processor 1004 is connected to a communication infrastructure 1006 (e.g., a bus). Computer system 1000 also includes user input/output device(s) 1003, such as monitors, keyboards, pointing devices, etc., that communicate with communication infrastructure 1006 through user input/output interface(s) 1002. Computer system 1000 also includes a main or primary memory 1008, such as random access memory (RAM). Main memory 1008 may include one or more levels of cache. Main memory 1008 has stored therein control logic (e.g., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to some aspects, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1000, main memory 1008, secondary memory 1010 and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 10. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "aspects" "an example," "examples," or similar phrases, indicate that the aspect(s) described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE), comprising:
   a transceiver configured to enable wireless communication with a base station; and
   a processor communicatively coupled to the transceiver and configured to:
   determine a comb offset for each of a plurality of Sounding Reference Signal (SRS) transmission occasions for the UE, wherein the comb offset changes between each SRS transmission occasion of the plurality of SRS transmission occasions, and wherein:
   the comb offset for the each SRS transmission occasion is determined as CombOffset(k)=mod (CombOffset+F(mod (k,COMB),COMB),
   k is a non-negative integer indicating the SRS transmission occasion,
   COMB is a Radio Resource Control (RRC) configured comb size configuration,
   mod is a modulo operation,
   CombOffset is a RRC configured comb offset,
   F is an offset applied to the RRC configured comb offset, and
   CombOffset(k) is the comb offset for the SRS transmission occasion k;
   generate a first SRS for a first SRS transmission occasion of the plurality of SRS transmission occasions using the determined comb offset corresponding to the first SRS transmission occasion; and
   transmit, using the transceiver, the first SRS to the base station.

2. The UE of claim 1, wherein the offset applied to the RRC configured comb offset includes one or more of sequences including:
   {0, 1} for the RRC configured comb size configuration of comb 2 configuration,
   {0, 3, 2, 1}, {0, 1, 2, 3}, or {0, 2, 1, 3} for the RRC configured comb size configuration of comb 4 configuration, and
   {0, 1, 2, 3, 4, 5, 6, 7}, {0, 3, 6, 1, 4, 7, 2, 5}, {0, 5, 2, 7, 4, 1, 6, 3}, {0, 7, 6, 5, 4, 3, 2, 1}, or {0, 4, 2, 6, 1, 5, 3, 7} for the RRC configured comb size configuration of comb 8 configuration.

3. The UE of claim 1, wherein the processor is configured to determine the comb offset for the each SRS transmission occasion a number of times within a slot.

4. The UE of claim 3, wherein the number of times is determined by a number of symbols used for SRS transmission divided by a repetition factor.

5. The UE of claim 4, wherein the processor is configured to determine the number of symbols used for the SRS transmission and the repetition factor from a RRC message from the base station.

6. The UE of claim 1, wherein the processor is configured to determine the comb offset for each SRS transmission occasion once in a slot.

7. The UE of claim 1, wherein the processor is configured to determine the comb offset for each SRS transmission occasion when the plurality of SRS transmission occasions share a same frequency location.

8. The UE of claim 1, wherein the processor is configured to determine the comb offset for each SRS transmission occasion when the plurality of SRS transmission occasions have different frequency locations.

9. A method, comprising:

determining, by a user equipment (UE), a comb offset for each of a plurality of Sounding Reference Signal (SRS) transmission occasions for the UE, wherein the comb offset changes between each SRS transmission occasion of the plurality of SRS transmission occasions, and wherein:

the comb offset for the each SRS transmission occasion is determined as CombOffset(k)=mod (CombOffset+ F(mod (k,COMB),COMB), k is a non-negative integer indicating the SRS transmission occasion, COMB is a Radio Resource Control (RRC) configured comb size configuration, mod is a modulo operation, CombOffset is a RRC configured comb offset, F is an offset applied to the RRC configured comb offset, and CombOffset(k) is the comb offset for the SRS transmission occasion k;

generating, by the UE, a first SRS for a first SRS transmission occasion of the plurality of SRS transmission occasions using the determined comb offset corresponding to the first SRS transmission occasion; and transmitting, by the UE, the first SRS to a base station.

10. The method of claim 9, wherein the offset applied to the RRC configured comb offset includes one or more of sequences including:

{0, 1} for the RRC configured comb size configuration of comb 2 configuration,

{0, 3, 2, 1}, {0, 1, 2, 3}, or {0, 2, 1, 3} for the RRC configured comb size configuration of comb 4 configuration, and {0, 1, 2, 3, 4, 5, 6, 7}, {0, 3, 6, 1, 4, 7, 2, 5}, {0, 5, 2, 7, 4, 1, 6, 3}, {0, 7, 6, 5, 4, 3, 2, 1}, or {0, 4, 2, 6, 1, 5, 3, 7} for the RRC configured comb size configuration of comb 8 configuration.

11. The method of claim 9, further comprising determining the comb offset for the each SRS transmission occasion a number of times within a slot.

12. The method of claim 11, further comprising determining the number of times by dividing a number of symbols used for SRS transmission by a repetition factor.

13. The method of claim 12, further comprising determining the number of symbols used for the SRS transmission and the repetition factor from a RRC message received from the base station.

14. The method of claim 9, further comprising determining the comb offset for each SRS transmission occasion once in a slot.

15. The method of claim 9, further comprising determining the comb offset for each SRS transmission occasion when the different plurality of SRS transmission occasions share a same frequency location.

16. The method of claim 9, further comprising determining the comb offset for each SRS transmission occasion when the different plurality of SRS transmission occasions have different frequency locations.

17. A non-transitory computer-readable medium storing instructions that when executed by a processor of a user equipment (UE), the instructions cause the processor to perform operations comprising:

determining a comb offset for each of a plurality of Sounding Reference Signal (SRS) transmission occasions for the UE, wherein the comb offset changes between each SRS transmission occasion of the plurality of SRS transmission occasions, and wherein:

the comb offset for the each SRS transmission occasion is determined as CombOffset(k)=mod (CombOffset+ F(mod (k,COMB),COMB), k is a non-negative integer indicating the SRS transmission occasion, COMB is a Radio Resource Control (RRC) configured comb size configuration, mod is a modulo operation, CombOffset is a RRC configured comb offset, F is an offset applied to the RRC configured comb offset, and CombOffset(k) is the comb offset for the SRS transmission occasion k;

generating a first SRS for a first SRS transmission occasion of the plurality of SRS transmission occasions using the determined comb offset corresponding to the first transmission occasion; and transmitting the first SRS to a base station.

18. The non-transitory computer-readable medium of claim 17, the operations further comprising determining the comb offset for each SRS transmission occasion a number of times within a slot by dividing a number of symbols used for SRS transmission by a repetition factor, wherein the number of symbols for the SRS transmission and the repetition factor are received in a RRC message from the base station.

19. The non-transitory computer-readable medium of claim 17, wherein the offset applied to the RRC configured comb offset includes one or more of sequences including:

{0, 1} for the RRC configured comb size configuration of comb 2 configuration,

{0, 3, 2, 1}, {0, 1, 2, 3}, or {0, 2, 1, 3} for the RRC configured comb size configuration of comb 4 configuration, and {0, 1, 2, 3, 4, 5, 6, 7}, {0, 3, 6, 1, 4, 7, 2, 5}, {0, 5, 2, 7, 4, 1, 6, 3}, {0, 7, 6, 5, 4, 3, 2, 1}, or {0, 4, 2, 6, 1, 5, 3, 7} for the RRC configured comb size configuration of comb 8 configuration.

* * * * *